US012706893B2

(12) United States Patent
Boucadair et al.

(10) Patent No.: US 12,706,893 B2
(45) Date of Patent: Aug. 11, 2026

(54) METHOD FOR MANAGING COMMUNICATION BETWEEN TERMINALS IN A COMMUNICATION NETWORK, AND DEVICES AND SYSTEM FOR IMPLEMENTING THE METHOD

(71) Applicant: Orange, Issy-les-Moulineaux (FR)

(72) Inventors: Mohamed Boucadair, Chatillon Cedex (FR); Christian Jacquenet, Chatillon Cedex (FR)

(73) Assignee: Orange, Issy-les-Moulineaux (FR)

( * ) Notice: Subject to any disclaimer, the term of this patent is extended or adjusted under 35 U.S.C. 154(b) by 171 days.

(21) Appl. No.: 17/597,122

(22) PCT Filed: Jun. 24, 2020

(86) PCT No.: PCT/FR2020/051102

§ 371 (c)(1),
(2) Date: Dec. 27, 2021

(87) PCT Pub. No.: WO2020/260825

PCT Pub. Date: Dec. 30, 2020

(65) Prior Publication Data

US 2022/0272079 A1 Aug. 25, 2022

(30) Foreign Application Priority Data

Jun. 28, 2019 (FR) ....................................... 1907115

(51) Int. Cl.
*H04L 29/06* (2006.01)
*H04L 9/40* (2022.01)
(Continued)

(52) U.S. Cl.
CPC ........ *H04L 63/061* (2013.01); *H04L 63/0823* (2013.01); *H04L 63/1408* (2013.01);
(Continued)

(58) Field of Classification Search
CPC ... H04L 63/061; H04L 67/56; H04L 63/0823; H04L 63/1408; H04L 63/166; H04L 69/165; H04L 69/18; H04W 12/102
(Continued)

(56) References Cited

U.S. PATENT DOCUMENTS 11,599,890 B1 * 3/2023 Kalaboukis ........... H04M 3/543
2003/0101353 A1 * 5/2003 Tarquini .............. H04L 63/1408 726/23

(Continued)

FOREIGN PATENT DOCUMENTS

EP 3361695 A1 8/2018
EP 3522473 A1 8/2019
WO WO 2018/076183 A1 5/2018

OTHER PUBLICATIONS

Fernando, "Mobile Cloud computing: A survey", 2013, Elsevier, pp. 84-106 (Year: 2013).*

(Continued)

*Primary Examiner* — Taghi T Arani
*Assistant Examiner* — Gregory A Lane
(74) *Attorney, Agent, or Firm* — Knobbe, Martens, Olson & Bear, LLP

(57) ABSTRACT

A method for communication in a network is disclosed, between a first and second terminal between which is established a first encrypted connection for transmitting data. The method comprises at the first terminal: storing, in association with the first connection, at least one second connection between the first terminal and the second terminal via an intermediate processing function intended to be applied between the first terminal and the second terminal to a part of the data referred to as eligible for the second connection, and a filter characterizing the data eligible for the second connection, the second connection being encrypted between the first terminal and the intermediate
(Continued)

processing function, and sending, via the second connection, a message intended for the intermediate function and carrying data for the second terminal corresponding to the filter, the first message sent comprising information according to which the data are intended for the second terminal.

19 Claims, 12 Drawing Sheets

(51) Int. Cl.
*H04L 67/56* (2022.01)
*H04L 69/165* (2022.01)
*H04L 69/18* (2022.01)
*H04W 12/102* (2021.01)

(52) U.S. Cl.
CPC ............ *H04L 63/166* (2013.01); *H04L 67/56* (2022.05); *H04L 69/165* (2013.01); *H04L 69/18* (2013.01); *H04W 12/102* (2021.01)

(58) Field of Classification Search
USPC .......................................................... 713/168
See application file for complete search history.

(56) References Cited

U.S. PATENT DOCUMENTS

2007/0140159 A1* 6/2007 Eronen ................. H04L 69/165 370/328
2010/0153726 A1* 6/2010 Liu ................... H04W 12/0431 713/168
2012/0066496 A1* 3/2012 Blom .................. H04W 12/041 713/168
2013/0259235 A1* 10/2013 Yao ....................... H04L 9/0838 380/279
2013/0301828 A1* 11/2013 Gouget ................. H04L 9/0877 380/44
2015/0124827 A1* 5/2015 Rangaraman ........... H04L 69/22 370/392
2015/0281181 A1* 10/2015 Albisu .................. H04L 63/029 726/7
2016/0014149 A1* 1/2016 Bradley .............. H04L 63/1408 726/14
2016/0142373 A1* 5/2016 Ossipov .............. H04L 63/0807 713/171
2019/0116535 A1* 4/2019 Szilagyi ................ H04W 24/10
2019/0268764 A1* 8/2019 Wei ..................... H04W 12/033
2019/0356482 A1* 11/2019 Nix ..................... H04W 12/041
2020/0076835 A1* 3/2020 Ladnai .................. G06F 16/955

OTHER PUBLICATIONS

Gupta, "A Survey of 5G Network: Architecture and Emerging Technologies", 2015, IEEE, pp. 1206-1229 (Year: 2015).*
Iyengar, J. and M. Thomson, "*QUIC: A UDP-Based Multiplexed and Secure Transport*", draft-ietf-quic-transport-14 (work in progress), Aug. 2018.
Rescorla, E., "*The Transport Layer Security (TLS) Protocol Version 1.3*", RFC 8446, DOI 10.17487/RFC8446, 2018.
Rüth, J., Poese, I., Dietzel, C., and O. Hohlfeld, "*A First Look at QUIC in the Wild*", Passive Active Measurements Conference (PAM), 2018.
International Search Report for International Application No. PCT/FR2020/051102, mailed on Dec. 7, 2020.

* cited by examiner

| Primary_Connection_Ref | | | |
|---|---|---|---|
| | Secondary_Connection_Ref1 | List Stream_IDs | List Connection_IDs |
| | | | |

```
+-+-+-+-+-+-+-+-+-+-+-+-+-+-+-+-+-+-+-+-+-+-+-+-+-+-+-+-+-+-+-+-+
|D|                       Third Party ID                          :
+-+-+-+-+-+-+-+-+-+-+-+-+-+-+-+-+-+-+-+-+-+-+-+-+-+-+-+-+-+-+-+-+
:                         Shared Token                            :
+-+-+-+-+-+-+-+-+-+-+-+-+-+-+-+-+-+-+-+-+-+-+-+-+-+-+-+-+-+-+-+-+
:                       List Stream_IDs                           :
//                                                                //
+-+-+-+-+-+-+-+-+-+-+-+-+-+-+-+-+-+-+-+-+-+-+-+-+-+-+-+-+-+-+-+-+
:                     List Connection_IDs                         :
//                                                                //
+-+-+-+-+-+-+-+-+-+-+-+-+-+-+-+-+-+-+-+-+-+-+-+-+-+-+-+-+-+-+-+-+
```

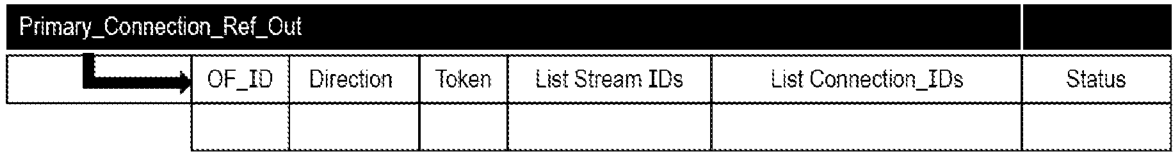
| Primary_Connection_Ref_Out | | | | | | |
|---|---|---|---|---|---|---|
| | OF_ID | Direction | Token | List Stream IDs | List Connection_IDs | Status |
| | | | | | | |
FIG. 4b
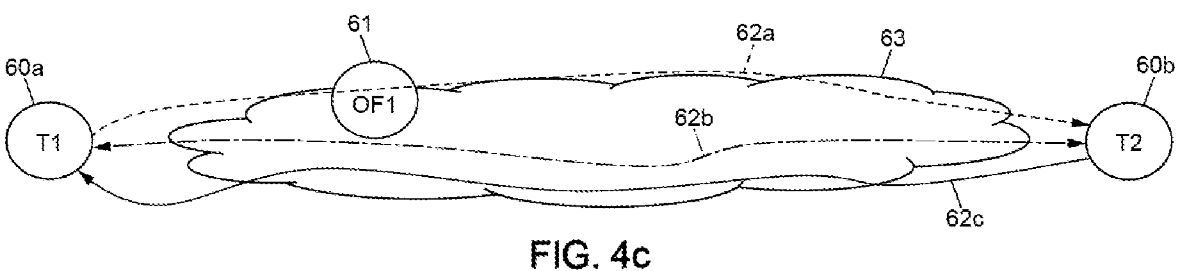
FIG. 4c
| Primary_Connection_Ref_Out | | | | | | |
|---|---|---|---|---|---|---|
| | OF_ID | Direction | Token | List Stream IDs | List Connection_IDs | Status |
| | OF1 | 0 | mytoken | stream1_id | Any | 0 |
FIG. 4d
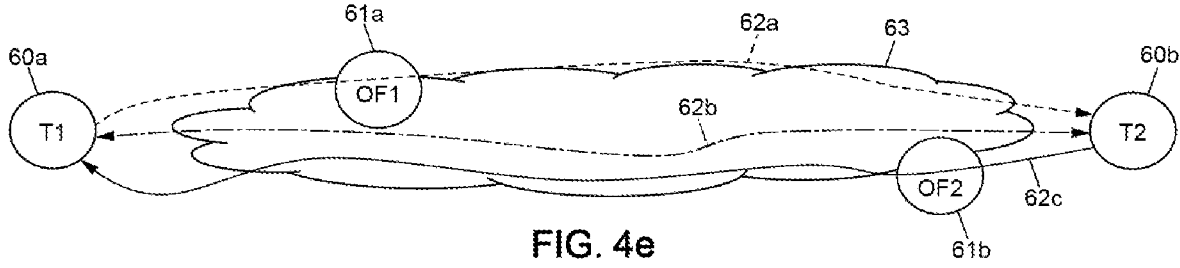
FIG. 4e
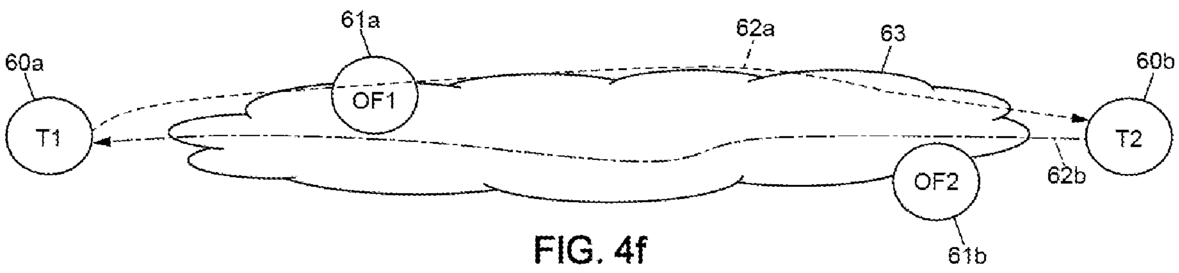
FIG. 4f

| Field |
| --- |
| \| D \| Third Party ID : |
| : Shared Token : |
| // List Active Stream_IDs // |
| // List Disabled Stream_IDs // |
| // List Active Connection_IDs // |
| // List Disabled Connection_IDs // |

| Primary_Connection_Ref | | | | | |
|---|---|---|---|---|---|
| → | OF_ID | Direction | Token | List Stream IDs | List Connection_IDs |
| | | | | | |

METHOD FOR MANAGING COMMUNICATION BETWEEN TERMINALS IN A COMMUNICATION NETWORK, AND DEVICES AND SYSTEM FOR IMPLEMENTING THE METHOD

CROSS-REFERENCE TO RELATED APPLICATIONS

This application is filed under 35 U.S.C. § 371 as the U.S. National Phase of Application No. PCT/EP2020/051102 entitled "METHOD FOR MANAGING COMMUNICATION BETWEEN TERMINALS IN A COMMUNICATION NETWORK, AND DEVICES AND SYSTEM FOR IMPLEMENTING THE METHOD" and filed Jun. 24, 2020, and which claims priority to FR 1907115 filed Jun. 28, 2019, each of which is incorporated by reference in its entirety.

BACKGROUND

Field

This disclosure relates to a method for managing a communication between a first terminal and a second terminal in a communication network, as well as to devices for implementing this method. It applies in particular to the management of communications using an encrypted connection, such as a communication according to the QUIC protocol for example.

Description of the Related Technology

The QUIC protocol described in the draft specification of the Internet Engineering Task Force (IETF) entitled "QUIC: A UDP-Based Multiplexed and Secure Transport" is an example of a transport protocol specified by the Internet community for satisfying the requirements of certain applications. The QUIC protocol is based on the UDP protocol (which stands for "User Datagram Protocol") rather than on the TCP protocol (which stands for "Transmission Control Protocol") because it aims to reduce the latency times generally observed when establishing TCP connections.

Unlike the TLS protocol (which stands for "Transport Layer Security") which is used to secure TCP connections, QUIC not only encrypts the payload data, but also the connection control information. The QUIC information sent unencrypted is limited to the bare minimum (for example, the connection identifier). QUIC thus makes it possible to establish connections that are encrypted end-to-end.

However, the specification of the QUIC protocol does not envisage a mechanism for collaboration between a QUIC terminal (including the applications it supports) and an operator network in order to offer the user a better quality of experience (QOE), for example via the implementation in the network of functions offering various services such as anti-virus services, packet inspection, address and port translations, etc. In particular, such cooperation must not cause additional delays in establishing connections compared to those of connections which do not involve a network function.

Yet the presence of such functions in the network can have an impact on the execution of a QUIC connection.

Changes to addresses or port numbers executed by a network function such as a network address and port translation (NAPT) function can thus lead to instability of the QUIC connection because the remote terminal must verify with each modification that it is indeed the QUIC terminal which is at the origin of said modification. The QUIC requests used for this verification may be rejected (because of a "rate-limit" policy) or fail because the terminal is not aware of the changes made to its packets sent over the network.

In addition, due to the encryption of the messages, a network function placed on the path of a QUIC communication cannot access the data exchanged during this communication.

SUMMARY

This disclosure improves the situation.

According to a first aspect, there is proposed a method for communication in a network, between a first terminal and a second terminal between which is established a first encrypted connection for transmitting data, the method comprising at the first terminal: storing, in association with said first connection, at least one second connection between the first terminal and the second terminal via at least one intermediate processing function intended to be applied to at least a part of said data referred to as eligible for the second connection, and a filter characterizing said data eligible for the second connection, said second connection being encrypted between the first terminal and said intermediate processing function; and sending, via said second connection, at least one message intended for said intermediate function and carrying data for the second terminal corresponding to said filter, the first message sent at least comprising information according to which said data are intended for the second terminal.

Thus, the proposed method introduces the concept of collaborative connections between two terminals, where a plurality of secondary encrypted connections (second connections within the meaning of the proposed method) is associated with a primary encrypted connection established between the two terminals (first connection within the meaning of the proposed method), and can advantageously benefit from the execution of processing functions offered by the network. By virtue of the proposed method, the data exchanged via the plurality of connections established between the two terminals are, from the point of view of the terminals, associated with one and the same connection, namely the primary connection.

Depending on the embodiment, the various processing functions can be invoked successively (i.e., the same packet of a collaborative connection will be processed by one or more processing functions also designated herein as OF (Offered Function) functions, according to an invocation order typically provided by a terminal) or according to a chronology specific to each context.

By this means, the proposed method allows enhancing the operator's network by introducing processing functions optimizing the use of resources mobilized for establishing and maintaining encrypted connections between terminals, such as QUIC connections. Said processing functions are not limited to those optimizing the use of network resources: other types of functions may be requested such as error detection and correction functions (FEC, Forwarding Error Correction). The network operator thus has the possibility of improving the level of quality associated with these connections as perceived by users.

This results in a simplification of the use of QUIC clients on the terminals, due to a practical collaboration with the network.

In addition, it should be noted that the level of security and robustness associated with each primary encrypted connection is maintained, the secondary connections themselves being encrypted between each processing function and the terminals, and where appropriate in between the processing functions when they are successively invoked. Also, the consent of the terminals may be required for invocation of intermediate processing functions in a collaborative communication. In doing so, only the trust functions that do not alter the security level of a connection are called.

The proposed method thus advantageously makes it possible to involve OF functions in a communication between two terminals without inducing additional latency for the exchange of data (0-RTT, "Zero Round Trip Time", meaning that the payload data are transmitted as soon as the first packet used for establishing the connection is sent) between these two terminals.

The proposed method allows the possibility of the terminals controlling the selection of these processing functions. It introduces flexibility in the invocation and removal of processing functions; in particular, it makes it possible to have on-demand invocation of processing functions in the network.

In addition, the proposed method advantageously provides a mechanism for selecting a part of the data of a QUIC connection for which one or more OF functions can be invoked. Similarly, the direction of the traffic to which to apply the processing function(s) can also be left up to the terminals.

Thus, in one or more embodiments, a packet content inspection function (DPI, Deep Packet Inspection) or an anti-virus function can be selectively invoked for certain packets, without being invoked for all packets exchanged during a QUIC communication.

In one or more embodiments, a connection can multiplex several channels (also referred to as "streams" in the QUIC protocol), without limitations on the number of multiplexed channels, their type (unidirectional or bidirectional), or the origin of the establishment of these channels (at the initiative of the client or of the server). The proposed method thus offers the possibility of selectively choosing the channels of a connection benefiting from these or those processing functions. Also, the same channel may involve different functions during a connection, each being invoked exclusively for a part of the data associated with this same channel.

In one or more embodiments, the proposed method may further comprise: sending, via the first data connection to the second terminal, data which do not correspond to said filter.

In one or more embodiments, the proposed method may further comprise: upon receiving data via said second connection, associating said data with said first connection if the data correspond to said filter.

Note that a terminal can decide to send data via the first connection even if these data are eligible for the second connection. This decision is local to the terminal (e.g., controlled by the application layer).

In one or more embodiments, said first message further comprises a key intended to be presented by the intermediate function (OF) to the second terminal, and shared between the first terminal and the second terminal.

This embodiment makes it possible to reinforce the security of the proposed mechanism.

In one or more embodiments, the proposed method may further comprise: informing the second terminal, in at least one message sent via said first connection to the second terminal, of the use of said intermediate processing function for said at least a part of said data.

In one or more embodiments, said at least one message informing the second terminal of the use of said intermediate processing function comprises at least one item among: an identifier of said intermediate processing function; a key to be presented by the intermediate function to the second terminal; said filter characterizing the data eligible for said second connection; at least one connection identifier eligible for said second connection; and information about the direction of the data transmission via the second connection to which said intermediate processing function is applied.

In one or more embodiments, the use by the first terminal of said second connection in order to send data to the second terminal is subject to the reception by the first terminal of an acknowledgment from the second terminal of the use of said intermediate processing function.

In one or more embodiments, on the second connection, a plurality of intermediate processing functions can be applied to the data eligible for the second connection in a determined order and: said at least one message carrying data for the second terminal is intended for the first intermediate processing function that is to be applied to said data eligible for the second connection, said first message sent further comprises a first list ordered according to said determined order identifying the functions among said plurality of intermediate processing functions that are distinct from the first function and are to be applied to said eligible data.

In one or more embodiments, said first message sent further comprises a second list, ordered according to said determined order, of keys intended to be presented by each of the intermediate processing functions identified in the first list to the next intermediate processing function in said first list, or, for the last intermediate processing function of the first list, to the second terminal, the key intended to be presented to the second terminal being shared between the first terminal and the second terminal.

In one or more embodiments, the proposed method may further comprise: informing the second terminal via the first connection of a modification affecting the use of said intermediate processing function.

In one or more embodiments, said first connection is established between the first terminal and the second terminal according to the QUIC protocol; at least one said second connection is established according to the TLS protocol between the first terminal and the second terminal via at least one said intermediate function capable of decrypting the data exchanged via said second connection.

According to a second aspect, there is proposed a method for communication in a network, between a first terminal and a second terminal between which is established a first encrypted connection for transmitting data, the method comprising at the second terminal: storing, in association with said first connection, an intermediate processing function intended to be applied between the first terminal and the second terminal on at least a part of said data, a filter characterizing said at least a part of the data, and a key shared with the first terminal; receiving at least one first message originating from said intermediate function, carrying data sent by the first terminal; checking whether said data correspond to the stored filter; and, if they do correspond: accepting the establishment of a second encrypted connection with the intermediate function and associating said second connection with the first connection; and upon receiving data via said second connection corresponding to said filter, associating said data with the first connection.

In one or more embodiments, said first message further comprises a key presented by the intermediate processing function to the second terminal, the establishment of the second encrypted connection being accepted if said received key corresponds to a key shared with the first terminal.

In one or more embodiments, the proposed method may further comprise: sending data corresponding to said filter to the first terminal via said second connection, in a message intended for the intermediate function.

According to a third aspect, there is proposed a method for processing data transmitted in a network between a first terminal and a second terminal between which is established a first encrypted connection, the method comprising, for a first device configured to implement a first intermediate processing function for data transmitted between the first terminal and the second terminal over a second connection via said first device: receiving from a first device of the network at least one first message intended for the first device, carrying data sent by the first terminal intended for the second terminal, said first device of the network being the first terminal or a second device configured to implement a second intermediate processing function for said data, the second connection being encrypted between the first device and the first device, said first message comprising: a first ordered list identifying at least one second device of the network to be traveled through by said at least one message in order to be routed to the second terminal, said at least one second device being the second terminal or at least one third device configured to implement a third intermediate processing function for said data; and a second ordered list comprising at least one key intended to be presented by each device in the first list to the next device in said first list, the key intended to be presented to the second terminal being shared between the first terminal and the second terminal; applying the first intermediate processing function to said data carried in said at least one first message; updating the first list and the second list; and sending, to the next device identified in the first list, said at least one first message integrating the update to the first and second lists, with the data processed by the first intermediate processing function and the key extracted from the second list intended to be presented to the next device, the second connection being encrypted between the first device and the next device.

In one or more embodiments, the proposed method may further comprise: storing for the second connection: a source IP address and a source port number which are used by the first intermediate device to relay said data from said at least one first message; and a destination IP address and a destination port number corresponding to the next device identified in the first list, to which said data of said at least one first message are transmitted; receiving from the first device at least one second message intended for the first device, carrying data sent by the first terminal to the second terminal, in which the first list is absent; applying the first intermediate processing function to said data carried in said at least one second message; sending, to the stored destination IP address and destination port, said at least one second message with the data processed by the first intermediate processing function.

According to another aspect, there is provided a data communication device, comprising a processor and a memory operatively coupled to the processor, wherein the processor is configured to implement one of the embodiments of a method proposed in this description, as implemented in a first terminal device, in a second terminal device, or in a device configured to implement an intermediate processing function.

According to yet another aspect, there is provided a data communication system, comprising a first terminal, a second terminal, and a device for implementing one or more intermediate processing functions, these being configured to implement one of the embodiments of the method proposed in this description, as implemented in a first terminal device, in a second terminal device, and in a device configured to implement an intermediate processing function, respectively.

Another aspect relates to a computer program, loadable into a memory associated with a processor, and comprising portions of code for implementing one of the embodiments of the method proposed in this description, during the execution of said program by the processor.

Another aspect relates to a set of data representing, for example by way of compression or encoding, a computer program as proposed in this description.

Another aspect relates to a non-transitory storage medium for a computer-executable program, comprising a set of data representing one or more programs, said one or more programs comprising instructions which cause, during the execution of said one or more programs by a computer comprising a processor operatively coupled to a memory and to an input/output data communication interface, the computer to manage a communication between a first terminal and a second terminal in a communication network according to one of the embodiments of the method proposed in this description, as implemented in a first terminal device, in a second terminal device, or in a device configured to implement an intermediate processing function.

BRIEF DESCRIPTION OF THE DRAWINGS

Other features and advantages of the present disclosure will be apparent from the following description of some non-limiting embodiments, with reference to the accompanying drawings, in which:

FIG. 2*c* illustrates the correlation of a collaborative connection with the underlying network according to one or more embodiments.

FIG. 4*b* illustrates an example of a table (TRS) for managing information messages about the use of intermediate processing functions according to one or more embodiments.

FIG. 4*c* illustrates an example of an invocation of an intermediate processing function between a first terminal and a second terminal according to one or more embodiments.

FIG. 4*d* illustrates an example of a TRS table managed by a terminal according to one or more embodiments.

FIG. 4*e* illustrates an example of an invocation of an intermediate processing function between a first terminal and a second terminal according to one or more embodiments.

FIG. 4*f* illustrates an example of an invocation of a plurality of intermediate processing functions between a first terminal and a second terminal according to one or more embodiments.

DETAILED DESCRIPTION

Figure 1A:
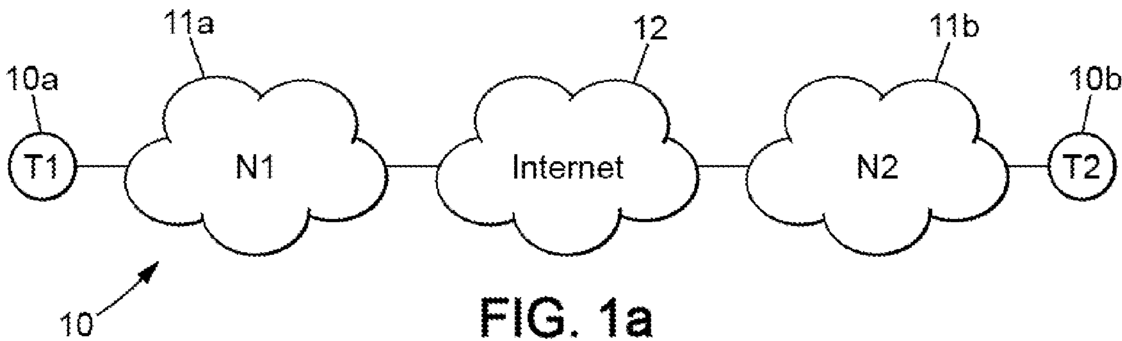
FIG. 1*a* illustrates an example of a communication system in which one or more embodiments of the proposed methods, devices, and systems can be implemented.

In the following detailed description of embodiments of the present disclosure, many specific details are presented to provide a more complete understanding. Nevertheless, a person skilled in the art can appreciate that some embodiments can be put into practice without these specific details. In other cases, well-known features are not described in detail in order to avoid unnecessarily complicating this description.

This description refers to functions, units, modules, platforms, and diagram illustrations of the methods and devices according to one or more embodiments. Each of the functions, modules, platforms, units, and diagrams described may be implemented in hardware, software (including in the form of embedded software ("firmware") or "middleware"), microcode, or any combination of these. In the case of implementation in software, the functions, motors, units, modules, and/or diagram illustrations may be implemented by computer program instructions or software code, which may be stored or transmitted on a computer-readable medium, including a non-transitory medium, or a medium loaded in the memory of a generic/specific computer or of any other programmable data processing apparatus or device in order to produce a machine, such that the computer program instructions or software code, executed on the computer or the programmable data processing apparatus or device, constitute means for implementing these functions.

Embodiments of a computer-readable medium include, but are not limited to, electronic storage media and communication media, including any medium facilitating the transfer of a computer program from one location to another. "Electronic storage medium/media" is understood to mean any physical medium that can be accessed by a computer. Examples of electronic storage media include, but are not limited to, flash drives or components or any other flash memory devices (for example USB keys, memory keys, memory sticks, discs on key), CD-ROMs or other optical data storage devices, DVDs, magnetic disc data storage devices or other magnetic data storage devices, data memory components, RAM, ROM, EEPROM memories, memory cards ("smart cards"), SSD ("Solid State Drive") type memories, and any other form of medium that can be used to transport or store or save data or data structures which can be read by a computer processor. The instructions may, depending on the embodiments, comprise code in any computer programming language or computer program element.

In addition, the terms "in particular", "for example", "example", "typically" are used in this description to denote examples or illustrations of non-limiting embodiments, which do not necessarily correspond to embodiments that are preferred or advantageous over other possible aspects or embodiments.

In this description, "server" is understood to mean any point of service (virtualized or not) or device providing data processing, one or more databases, and/or data communication functions. For example, and without limitation, the term "server" can refer to a physical processor operatively coupled with associated communication, database, and data storage functions, or can refer to a network, a group, an assembly or a complex of processors and associated data storage and networking devices, as well as an operating system and one or more database system(s) and application software supporting the services and functions provided by the server.

The terms "network" and "communication network" as used in this description refer to one or more data links which can couple or connect devices, possibly virtualized, so as to allow the transport of electronic data between computer systems and/or modules and/or other electronic devices or equipment. A network can comprise, in whole or in part, the Internet, one or more local area networks (LAN), one or more wide area networks (WAN), networks with wired connections, with wireless connections, cellular type networks, or any combination of these various networks.

The term "application" as used in this description denotes any tool which functions and is operated by means of a computer, in order to provide or perform one or more function(s) or task(s) for a user or another application program. To interact with an application and to control it, a user interface (for example a graphical user interface or GUI) may be provided on the device on which the application is implemented.

The term "terminal" is used in this description to denote any entity, such as a software entity, capable of establishing or receiving communications based on the use of one or more transport protocols, such as TCP or UDP, and/or any entity capable of functioning as an end point of a communication established according to the procedures of a communication protocol, such as, without limitation, the QUIC, UDP, DTLS, or TLS protocols. For a given communication, a terminal that implements a communication protocol can act as a client, server, or both. Examples of terminals include, without limitation, fixed or mobile terminals, intelligent terminals ("smart phones"), personal computers (or "PCs"), tablets, Internet servers, etc. Certain decisions related to the establishment and management of communications may be made by the terminal or by one of the applications embedded in the terminal, and which has the capacity to use the QUIC resources. This description concerns both cases: the one where the decisions are made by the terminal, and the one where the decisions are made by an application embedded in this terminal.

The term "packet", as used in this description, designates without limitation any data unit capable of being carried or transmitted between two network nodes, two stations, two terminals, or through one or more data networks. "Packet" can designate one or more frames, one or more protocol data units (or "PDUs"), one or more datagrams, or any other data unit. A packet, for example, can include a group of bits, which can include one or more address fields, one or more control (or signaling) fields, and/or one or more payload fields.

"Function", "intermediate processing function", "intermediate function", or "network function" are understood to mean any packet processing function such as a network address translation function (NAT), a function intended to improve the quality of service (e.g., a traffic labeling and classification function), a firewall function, a function for optimizing communications established on the TCP transport protocol (PEP, Performance Enhancing Proxy), MPTCP proxy, etc.

"QUIC protocol", or in short "QUIC", is understood to mean any protocol in compliance with a version of the QUIC protocol specification or draft specification, such as the draft specification of the IETF entitled "QUIC: A UDP-Based Multiplexed and Secure Transport", or the specification of the "Quick UDP Internet Connections" protocol, known as the "gQUIC" protocol, including the existing versions of these specifications or draft specifications and their evolutions. More generally, QUIC here denotes any transport protocol encapsulated in another UDP or UDP-lite ("Lightweight User Datagram Protocol") data protocol but whose primitives and payload are encrypted.

Although the exemplary embodiments described below are based on communications established according to the QUIC protocol, those skilled in the art will understand that these examples are not limiting, as the proposed method can also be implemented, in other embodiments, using other protocols to establish encrypted communication (DTLS or TLS, for example).

In one or more embodiments, the logic for selecting the QUIC channels (or "streams"), connections, and packets eligible for requesting at least one intermediate processing function is provided to a terminal in the form of policies. The logic of removing an OF function from a connection is a policy which can be local to the terminal or else at the initiative of the operator, for example within the framework of a scheduled maintenance procedure. These policies may be managed directly by the application, relying on the resources of a collaborative connection.

It is assumed that one or more paths may be used to exchange data between two terminals. Thus, data associated with different channels can be routed via a single path or via separate paths. No assumption is made as to the support for the functions for establishing QUIC communications via multiple paths by the terminals or as to the existence of these multiple paths.

FIG. 1*a* illustrates an example of a communication system (10) in which one or more embodiments of the proposed methods and devices can be implemented.

The system (10) comprises a first terminal T1 (10*a*) which has established a connection with a second terminal T2 (10*b*) via a first access network (11*a*) to which the first terminal is connected, via the Internet (12), and via a second access network (11*b*) to which the second terminal T2 (10*b*) is connected. As a non-limiting example, the first and second access networks (11*a* and 11*b*) may be local area networks (LAN) in which the terminals T1 and T2 are respectively present. The architecture illustrated in FIG. 1*a* is not limiting, particularly in that the terminals T1 and T2 can connect to the same access network.

In one or more embodiments, the first terminal T1 and the second terminal T2 can be configured to establish one or more connections according to a communication protocol, such as the QUIC, UDP, DTLS, or TLS protocol, and for example to establish a connection according to this protocol and exchange data using this connection. Said configuration may be a default behavior of a terminal (i.e., no additional explicit configuration is required for activation of one of said communication protocols).

Figure 1B:
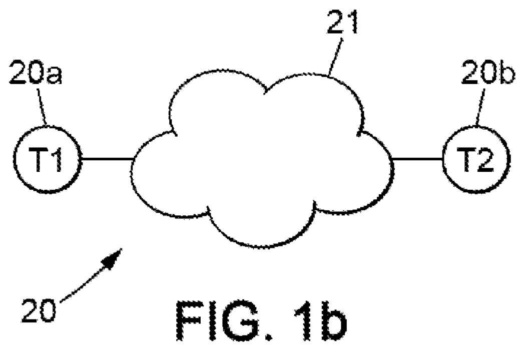
FIG. 1*b* illustrates a reference architecture for the implementation of the proposed method according to one or more embodiments.

FIG. 1*b* illustrates a reference architecture for the implementation of the proposed method according to one or more embodiments.

The system (20) comprises a first terminal T1 (20*a*) with which a connection according to a communication protocol is established with a second terminal T2 (20*b*) by means of a network (21) to which the first terminal T1 (20*a*) and the second terminal T2 (20*b*) are connected. The network (21) can be broken down into several sub-networks, for example such as those illustrated in FIG. 1*a*.

Again with reference to FIG. 1*a*, those skilled in the art will understand that the proposed method is not limited as to the number, nature, or location of the intermediate OF functions which can be invoked by a terminal. The OF functions may be hosted within network N1 (11*a*), N2 (11*b*), or any other network, including for example the Internet (12) (typically, data centers (DC)).

Similarly, an OF function may be located (or may not be located) on the default path traveled by the communication established between two terminals, but this does not mean that said OF function is systematically requested for all streams. Mechanisms for controlling the invocation of an OF function are described below.

For example, data requiring transcoding, data inspection, protocol adaptation, etc. will be explicitly intended to be processed by an OF function when so decided by at least one terminal involved in a connection.

For example, a WebRTC connection may involve channels of audio, video, presence, etc. Each of these channels may require separate OF functions, supported by the network.

An OF function may be inserted when initializing the establishment of a communication (for example the establishment of a connection), during the creation of a channel, or later on.

Figure 2A:
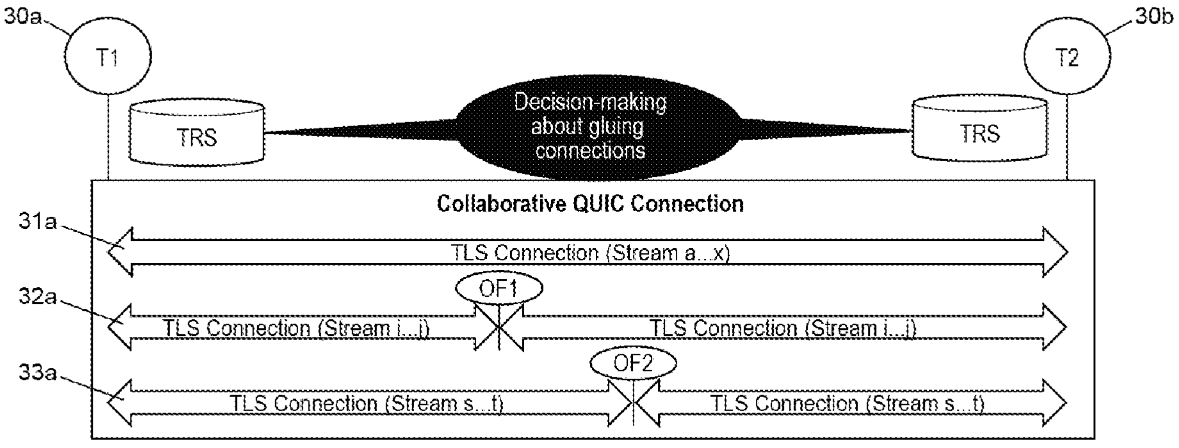
FIG. 2*a* illustrates an example of the primary and secondary connections established between two terminals according to one or more embodiments.
Figure 2B:
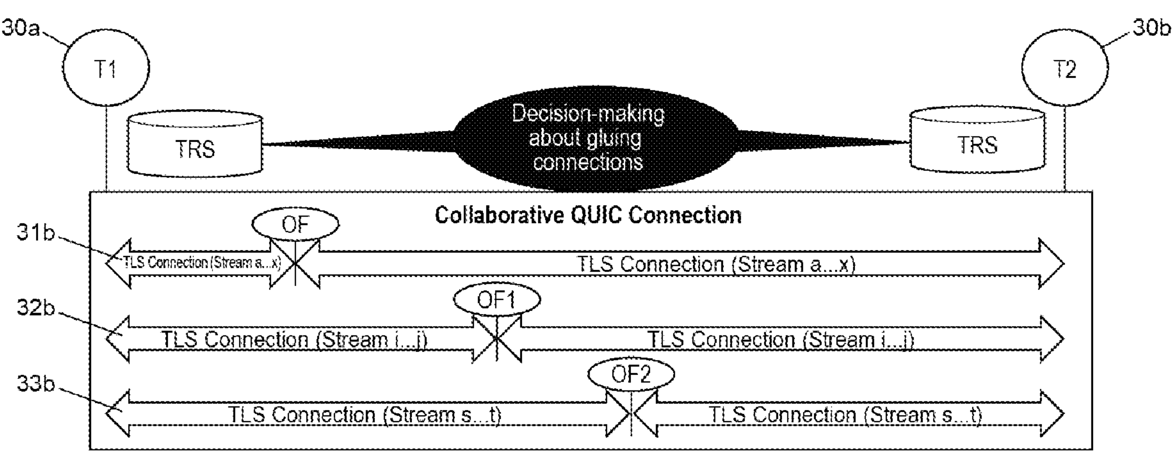
FIG. 2*b* illustrates an example of the primary and secondary connections established between two terminals according to one or more embodiments.

As mentioned above, the present disclosure allows the invocation of OF intermediate processing functions by introducing the concept of collaborative connections between two terminals T1 and T2, described in more detail below. In the embodiments in which several connections are established according to a communication protocol between two terminals T1 and T2, for example the QUIC protocol, the first connection established between the two terminals according to the QUIC protocol is hereinafter called the Primary Connection. This primary connection may be established directly between T1 and T2 (i.e., without invoking an OF function as illustrated by FIG. 2*a*) or via an OF function as shown in FIG. 2*b*. The other connections are called Secondary Connections.

FIGS. 2*a* and 2*b* thus show two terminals T1 (30*a*) and T2 (30*b*) between which several connections are established (in the illustrated example, QUIC connections).

FIG. 2*a* shows a primary connection (31*a*), established first, and two secondary connections (32*a* and 33*a*), established between the two terminals T1 (30*a*) and T2 (30*b*). The primary connection is established without invocation of an OF function, while the two secondary connections are each established with invocation of an intermediate function (respectively OF1 and OF2).

FIG. 2*b* shows a primary connection (31*b*), established first, and two secondary connections (32*b* and 33*b*), established between the two terminals T1 (30*a*) and T2 (30*b*). The primary connection is established with invocation of an OF function, as are the two secondary connections which are each established with invocation of a function (respectively OF1 and OF2).

In each of the examples illustrated by FIGS. 2*a* and 2*b*, the data exchanged via the primary connection are conveyed in channels indexed by {a . . . x}, while the data exchanged via a secondary connection are routed in the channels indexed here by {i . . . j} or by {s . . . t}. Thus, {a . . . x} is a list of primary channel identifiers, while {i . . . j} (or {s . . . t}) is a list of secondary channels. Data belonging to some of the primary channels {a . . . x} may also be eligible for a secondary connection {i . . . j}. Therefore, some identifiers of list {a . . . x} may be present in list {i . . . j}, in which case the two groups of channels {a . . . x} and {i . . . j} can have a non-zero intersection.

The data exchanged via separate secondary connections are routed in two channels {i . . . j} and {s . . . t}. The two groups {s . . . t} and {i . . . j} can have a non-zero intersection, where appropriate.

FIG. 2*c* illustrates the correlation of a collaborative connection with the underlying network. As illustrated in FIG. 2*c*, the different connections (31*c*, 32*c*, 33*c*), comprising the primary connection (31*c*) and one or more secondary connections (32*c*, 33*c*), can be established on the same path between T1 (30*a*) and T2 (30*b*).

Examples of an embodiment of the proposed method for managing collaborative connections are described below, in the non-limiting case of connections established according to the QUIC protocol.

A first terminal (for example terminal T1 of FIGS. 1*a*-2*c*) establishes an encrypted primary connection with a second terminal (for example the remote terminal T2 of FIGS. 1*a*-2*c*) according to the procedures described in the existing QUIC specification.

In one or more embodiments, the first terminal maintains a mapping table, hereinafter called the Collaborative Connections Table (CCT).

Figure 3A:
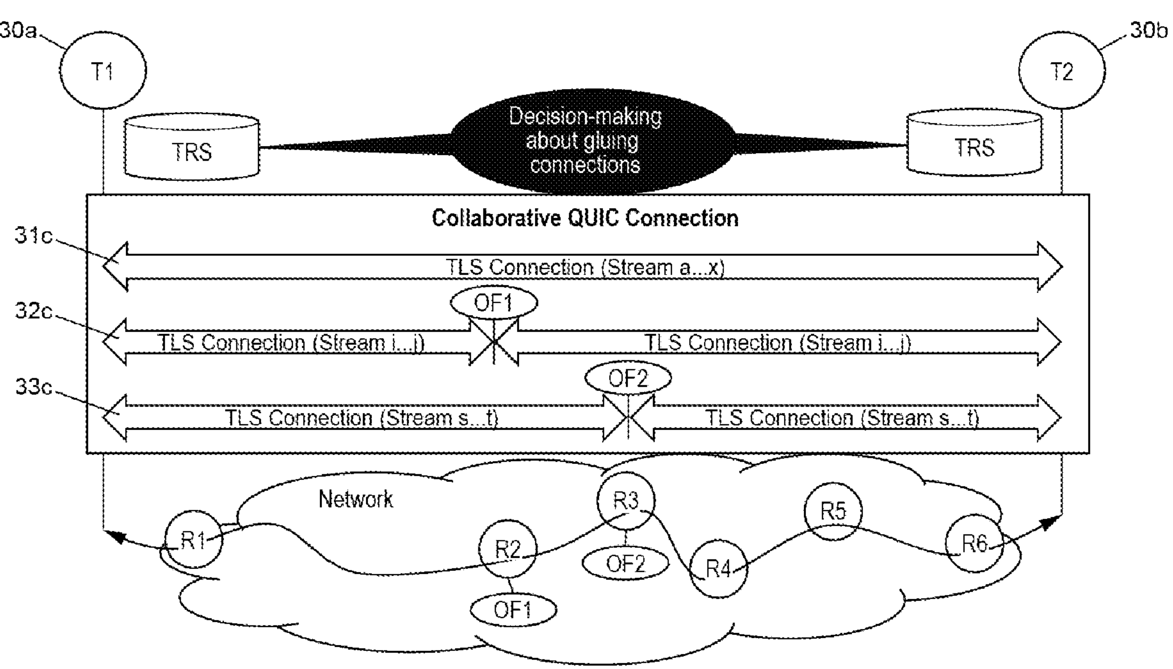
FIG. 3*a* illustrates an example of a collaborative connection table (CCT) according to one or more embodiments.

FIG. 3*a* shows an example structure of a CCT table identifying, for a primary connection (Primary_Connection_Ref), a secondary collaborative connection (Secondary_Connection_Ref1), and a filter characterizing the data eligible for this secondary collaborative connection. The term filter is understood to mean an indication or a set of indications which allow identifying the data eligible for a secondary connection, meaning the data which can be processed by the intermediate function or functions belonging to this secondary connection. This involves, by means of such indications, "filtering" the data which can travel the secondary connection. In the example illustrated in FIG. 3*a*, this filter is in the form of a list of eligible channels, meaning those which can be used to route the data corresponding to the collaborative connection, and a list of eligible connection identifiers. Security associations (based for example on the use of TLS/DTLS protocols) can be used as connection reference examples. Other reference formats may be used by the various elements involved in the procedure.

Thus, a CCT table can be generated and maintained in memory accessible to the first terminal in order to indicate a list of channels/connection identifiers eligible for collaborative connections, acting as a filter characterizing the data eligible for collaborative connections. Consequently, even if a function is authorized to establish secondary connections, the data relayed by this function for channels or presenting connection identifiers not entered in the CCT table can be identified and where appropriate rejected by the terminal. The list of channels or the list of connection identifiers are populated by the TRS table (TRUSTED_RELAYED_STREAMS).

Figures 3B, 4A:
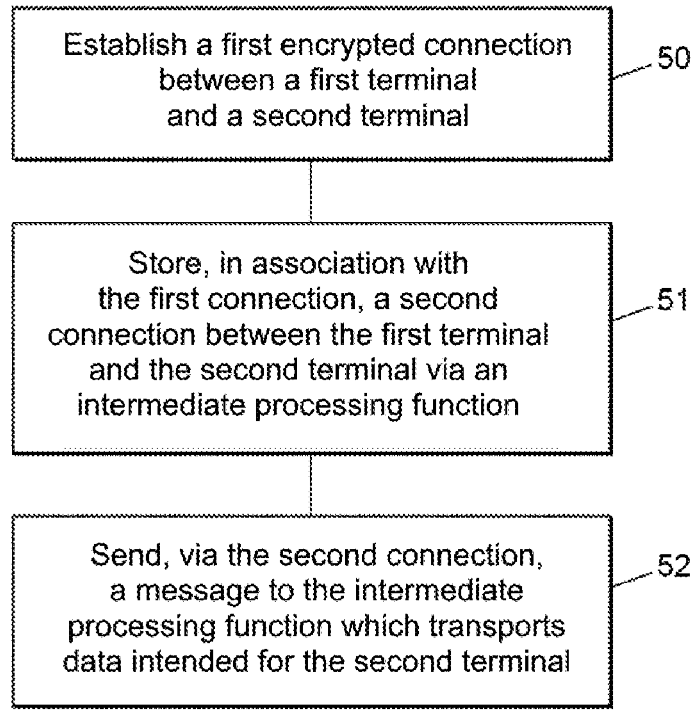
FIG. 3*b* is a diagram illustrating the proposed method according to one or more embodiments.
FIG. 4*a* illustrates an example of the QUIC COCON frame format according to one or more embodiments.

FIG. 3*b* is a diagram illustrating the proposed method according to one or more embodiments.

First and second terminals are considered, between which a first encrypted connection is established (50) to transmit data, for example according to the QUIC protocol.

The first terminal then stores (51), in association with said first connection, at least one second connection between the first terminal and the second terminal via at least one intermediate processing function intended to be applied between the first terminal and the second terminal to at least a part of said data referred to as eligible for the second connection, and a filter characterizing said data eligible for the second connection, said second connection being encrypted between the first terminal and said intermediate processing function. Such a filter is for example a connection identifier, a channel identifier, or any other template which makes it possible for a local terminal to select (or for a remote terminal to determine) the data eligible for a secondary connection. In the embodiments described below, the connection and channel identifiers are used as examples of filters, and the aforementioned information is stored in a CCT table as described above.

The proposed method thus advantageously makes it possible to introduce a second connection, between the two terminals between which a first connection is already established, via an intermediate processing function without impacting the first connection, and in particular without breaking it. The first and second connections are collaborative in that the first and second terminals manage the two connections (first and second connections) as if they were a single global connection.

The storing of this association between the first connection and the second connection makes it possible to associate with the first connection the data which are sent and received over the second connection, and corresponding to the filter defining the data which are eligible for the second connection.

The second connection can thus advantageously invoke one or more intermediate processing functions, respectively intended to be applied between the first terminal and the second terminal on the data eligible for the second connection.

In one or more embodiments, as illustrated in FIGS. 2$a$-2$c$, the second connection comprises several sections (between the first terminal and the intermediate function invoked in this second connection on the one hand, and between the intermediate function and the second terminal on the other hand). For example, this encryption is implemented according to a TLS security association established two-by-two between the various devices. When several intermediate functions are invoked successively between the first terminal and the second terminal, each section is individually encrypted.

Once the association between the first connection and the second connection is stored in the first terminal, the first terminal can send (52), via said second connection, at least one first message intended for said intermediate function and carrying data for the second terminal corresponding to said filter, the first message comprising information according to which said data are intended for the second terminal.

Examples of messages sent by the first terminal are given below.

In one or more embodiments, the first terminal can select by means of a filter the packets (channels) which are to request an OF function, in other words which are eligible for the second connection. The selected packets can be sent using as the destination address the address which provides access to the intermediate function (OF). The data conveyed by the packets are encrypted according to the security association (for example TLS) established between the first terminal and the OF function. In addition, in the non-limiting example in which the connections between the two terminals are established according to the QUIC protocol, the data can carry a new QUIC frame called RELAY(List {Next_Hop_IP address/port}, Shared Token, . . . ), comprising, in one embodiment, the fields described below:

List{Next_Hop_IP address/port}: Contains a list of addresses (and port numbers) which will be used by the OF intermediate function(s) invoked in the second connection, to route the packet to its final destination. In one or more embodiments, this list contains the IP address (and possibly a port number) of the second terminal (remote terminal) if a single OF function is requested in the path taken by the data. If several functions are requested, then said list is an ordered list which comprises, in addition to information making it possible to reach the remote terminal, information descriptive of the OF intermediate functions which are to be invoked. The first element of said ordered list points to the next OF function to be invoked, while the last element points to the remote terminal "Shared Token": Indicates a key to present for the next jump. In one or more embodiments, the same key can be used. Alternatively, the message may contain an ordered list of keys: List{Next_Hop_Shared Token}. A key in position "i" will be presented to element "i" of the list List{Next_Hop_IP address/port}. Thus, in one or more embodiments, the message sent by the first terminal may comprise a second list, ordered according to the order of the (first) list of functions, of keys intended to be presented by each of the intermediate processing functions identified in the first list to the next intermediate processing function in said first list, or, for the last intermediate processing function in the first list, to the second terminal, the key intended to be presented to the second terminal being shared between the first terminal and the second terminal. In one or more embodiments, the keys may only be present for the first data packet sent in a new secondary connection, and may therefore be omitted for the other packets.

Thus, in one or more embodiments, the first message sent by the first terminal via the second connection may comprise a key intended to be presented by the intermediate function to the second terminal, and shared between the first terminal and the second. terminal.

In one or more embodiments, the first terminal may decide to include the RELAY frame only for the first packets sent to an OF function (meaning in the first messages sent to the OF function). The other eligible packets are sent directly to the OF function (meaning without inserting a RELAY frame) which must process them using a dedicated table (called RCCB), described below.

For the other packets, meaning the packets which are not eligible for processing by an OF function (in other words for packets not corresponding to the filter associated with the secondary connection established via this OF function), the data is sent, in the embodiment described here, directly by the first terminal to the second terminal via the first connection (the primary connection). It should be noted that if several secondary connections are envisaged, if data correspond to a filter of another secondary connection, they will preferably be sent to the second terminal via this other secondary connection.

During the first connection, the first terminal may decide to insert the OF intermediate processing function for some or all of the channels of said connection established with the second terminal, for example for a part of the data sent to the second terminal.

The first terminal may inform the second terminal of the use of the intermediate processing function for a part of the data, by sending a message, informing of the use of an OF function, sent via the first connection to the second terminal.

The use of a message informing of the use of an OF function advantageously makes it possible to inform a remote terminal, with which a first encrypted connection is established, of the use of an intermediate processing function for some or all of the data transmitted or exchanged with this remote terminal, possibly indicating to the remote terminal information about a data eligibility criterion for the invocation of the function as used by the first terminal (in other words, by indicating a filter characterizing the eligible data).

In one or more embodiments, the message informing of the use of an OF function informing the second terminal of the use of the intermediate processing function may comprise at least one item among: an identifier of the intermediate processing function; a key to be presented by the intermediate function to the second terminal; the filter characterizing the data eligible for the second connection; at least one connection identifier eligible for the second connection; and information about the direction of transmission of data via the second connection to which said intermediate processing function is applied.

For example, in the non-limiting example in which the first connection between the two terminals is established according to the QUIC protocol, the first terminal may, in one or more embodiments, insert a new QUIC frame, called COCON (COllaborative CONnection), in a control message or a data message from the first connection (primary connection) to the remote terminal.

FIG. 4*a* illustrates an example of a QUIC COCON frame format, of which the fields are described below:

A direction indication bit "D": This bit can for example be set to "0" (respectively to "1") if the intermediate processing function is inserted only for the data sent by the first terminal (which sent the COCON frame to the second terminal), and can be set to "1" (respectively to "0") if the function can be used for both directions of the connection.

"Third Party ID": Indicates a (globally) unique identifier identifying an intermediate processing function (OF). In one or more embodiments, this identifier can be a hash (for example obtained using the SHA-256 algorithm) of the "Pre-Shared Key (PSK) identity" information used by the OF function in a TLS "ClientKeyExchange" message. Other structures may be used for this identifier.

"Shared Token": A key shared between the intermediate processing function (OF) and the terminal sending the frame.

"List Stream_IDs": A filter which lists one or more respective identifiers of one or more channels eligible for invocation of the intermediate processing function (OF) identified by the "Third Party ID" field. In one or more embodiments, this field may be defined by including a scenario in which this field contains no channel identifier, to indicate that the function can be invoked for all channels of a connection (i.e., all packets in said connection are eligible for invoking the OF function).

"List Connection ID": A filter which lists one or more connection identifiers eligible for invoking the OF intermediate processing function identified by the "Third Party ID" field. In one or more embodiments, this field can be defined by including a scenario in which this field contains no connection identifier, to indicate that the function can be invoked for all connection identifiers associated with this connection. In one or more embodiments, the list of connection identifiers indicated in a message informing of the use of a function (for example a COCON frame) can be updated automatically by a remote terminal following the migration of connection identifiers (for example, following the reception of a QUIC NEW CONNECTION frame).

In one or more embodiments, if no direction restriction is indicated in the message informing of the use of an OF function, the direction of invocation of the function can be inferred based on the direction of the associated channel. In the case of the QUIC protocol for example, the least significant bits of the "stream ID" indicate the nature of the channel: 0x0 (bidirectional channel established at the initiative of the client), 0x1 (bidirectional channel established at the initiative of the server), 0x2 (unidirectional channel established at the initiative of the client), and 0x3 (unidirectional channel established at the initiative of the server).

In one or more embodiments, several messages informing of the use of an OF function (for example COCON frames) can be sent if the first terminal decides to involve an OF intermediate processing function in different channels.

In one or more embodiments, several messages informing of the use of an OF function (for example COCON frames) can be sent if the first terminal decides to involve several OF intermediate processing functions.

In one or more embodiments, a message informing of the use of an OF function (for example a COCON frame) can be sent in any message of a connection, including the first message establishing the connection.

In one or more embodiments, an OF intermediate processing function may be embedded in a node located on the default path for routing data (or may not).

In one or more embodiments, the first terminal uses a dedicated TRS table, to save the offers sent (meaning the characterization of the (eligible) data which benefit from the invocation of one or more OF functions according to the information conveyed in the COCON frames and which led to the creation of entries in the TRS table).

In one or more embodiments, the first terminal may use a table managing the entries corresponding to the COCON frames sent to a remote terminal (to the second terminal) and another table managing the entries corresponding to the COCON frames received from the remote terminal. Alternatively, the same table may be used regardless of the origin of the COCON frames.

FIG. 4*b* illustrates an example of a table managing the entries corresponding to the messages informing of the use of an intermediate processing function sent to the second terminal according to one or more embodiments. The messages, which correspond to offers to use the OF function, are associated with a primary connection (called Primary_Connection_Ref").

FIG. 4*b* shows an example of a TRS table structure ("Primary_Connection_Ref Out" for offers sent for the primary connection "Primary_Connection_Ref"), which contains the following information:

"OF_ID": an identifier of an OF function.

"Direction": in one or more embodiments, this field indicates a first value indicating a use of the function identified by the unidirectional OF_ID field at the initiative of the first terminal, meaning for data sent by the first terminal, a second value indicating a use of the function identified by the unidirectional OF_ID field at the initiative of the second terminal, meaning for data sent by the second terminal, or a third value indicating a use of the function identified by the bidirectional OF_ID field, meaning for data sent by the first terminal or by the second terminal. For example, this field can indicate one of the following values: 0 (unidirectional at the initiative of the terminal), 1 (unidirectional at the initiative of the remote terminal), 2 (bidirectional).

"Token": A verification key which must be presented (by an OF function) in order to establish a new secondary connection associated with a primary connection.

List of "Stream IDs": A filter which lists the channels whose data can be relayed by the function identified in the OF_ID field (meaning the eligible channels). In one or more embodiments, a predetermined value (for example "Any") may be used to indicate that the function can be invoked by all channels of a connection.

List of "Connection IDs": A filter which lists the connection identifiers whose data are processed by the function identified in the OF_ID field (i.e., the eligible connection identifiers). In one or more embodiments, a predetermined value (for example "Any") may be used to indicate that the function can be invoked for any identifier of a connection.

"Status": Indicates whether the proposal to invoke one or more OF functions according to the information conveyed in a COCON frame has been confirmed by the remote terminal, or if the proposal is awaiting confirmation from the remote terminal. This field can be limited to a single bit, which will take a first value (for example "1", corresponding to "Confirmed") to indicate a proposal to use a function has been validated by the second terminal, and a second value (for example "0", corresponding to "Pending") to indicate that the proposal to use the function is awaiting validation by the second terminal. In one or more embodiments, this field may be set to the value of awaiting confirmation ("Pending") as long as a confirmation message has not been received from the second terminal. The confirmation message is typically an acknowledgment message sent by the second terminal after receiving the message informing of the use of an intermediate processing function (for example following the reception of a COCON frame).

In one or more embodiments, the use by the first terminal of the second connection to send data to the second terminal may be dependent on the reception by the first terminal of an acknowledgment from the second terminal of the use of the intermediate function. The first terminal can thus be configured so as not to send data via a secondary connection where an intermediate function (OF) will be invoked, for which the "Status" parameter is set to a value indicating that the second terminal is awaiting confirmation.

Alternatively, the confirmation message is a message called GLUE (Confirmed, . . . ) described below. In this case, the terminal can send the first packets via the OF function even if the "Status" parameter is set to "0". The terminal will decide according to the response from the remote terminal (typically, the terminal will continue to request the OF function if and only if a GLUE (Confirmed, . . . ) message has been received).

FIG. 4*c* illustrates an example of an invocation of an intermediate processing function (OF1) between a first terminal T1 (60*a*) and a second terminal T2 (60*b*).

With reference to the example illustrated by FIG. 4*c* (which uses the reference architecture illustrated by FIG. 1*b*), terminals T1 (60*a*) and T2 (60*b*) are in communication via a network (63) and maintain three data communication channels (62*a*, 62*b*, 62*c*) using an encrypted connection: The first channel (62*a*) is a unidirectional channel from T1 to T2, i.e., only T1 can send data in this channel. The second channel (62*b*) is a bidirectional channel between T1 and T2. Terminals T1 and T2 can send data in this channel which does not invoke an OF function. The third channel (62*c*) is a unidirectional channel from T2 to T1. Only T2 can send data in this channel which does not invoke an OF function.

In this example, the data of the various channels (62*a*, 62*b*, 62*c*) are routed via the same path.

Terminal T1 can involve function OF1 in the first channel (62*a*), while the data of the other channels are exchanged directly between T1 and T2. For this purpose, in one or more embodiments, terminal T1 (60*a*) inserts a frame COCON (D=0, OF1, mytoken, stream1_id) in a message intended for terminal T2 (60*b*): direction from terminal T1 to terminal T2 (D=0), function identifier OF1, "mytoken" key, channel identifier "stream1_id" corresponding to the first channel.

As described above, in one or more embodiments, terminal T1 (60*a*) can be configured to manage a table of offers to use OF functions for the primary connection with terminal T2 (60*b*) (TRS table), and instantiate an entry in its TRS table relative to the COCON frame transmitted to terminal T2 (60*b*), as illustrated in FIG. 4*d*.

FIG. 4*d* shows an example of a TRS table managed by terminal T1, in which information relating to the frame COCON(D=0, OF1, mytoken, stream1_id) sent to terminal T2 is recorded: identifier of the function ("OF ID") that is the object of the offer of use ("OF1"), direction of use of function OF1 ("Direction" field) indicating a unidirectional direction at the initiative of terminal T1 (value "0"), verification key ("Token" field filled in with the "myToken" key), list of channels whose data can be relayed by function OF1 ("List Stream IDs") indicating an identifier of the first channel (62*a*) ("stream1_id"), list of connection identifiers whose data are processed by function OF1 ("List Connection IDs") indicating that function OF1 can be used for any connection identifier ("Any"), and status of the offer to use function OF1 ("Status") indicating that the offer is awaiting validation by the remote terminal T2 (60*b*).

FIG. 4*e* illustrates another example of an invocation of two intermediate processing functions (OF1 and OF2) between a first terminal T1 (60*a*) and a second terminal T2 (60*b*).

With reference to the example of FIG. 4*e* (which uses the reference architecture of FIG. 1*b*), terminals T1 (60*a*) and T2 (60*b*) are in communication via a network (63) and maintain three data communication channels (62*a*, 62*b*, 62*c*) using an encrypted connection: The first channel (62*a*) is a unidirectional channel from T1 to T2, the second channel (62*b*) is a bidirectional channel between T1 and T2, and the third channel (62*c*) is a unidirectional channel from T2 to T1. In this other example, the data of the various channels (62*a*, 62*b*, 62*c*) are also routed via the same path.

Unlike the example of FIG. 4*c*, FIG. 4*e* illustrates an example in which a first function OF1 (61*a*) is invoked for the first two channels (62*a* and 62*b*), while a second function OF2 (61*b*) is invoked for the data of the third channel (62*c*). For this purpose, in one or more embodiments, terminal T1 (60*a*) can insert a frame COCON(OF1, mytoken, {stream1_id, stream2_id}, . . . ) in a message intended for terminal T2 (60*b*), and terminal T2 (60*b*) can insert a frame COCON(OF2, myowntoken, stream3_id, . . . ) in a message intended for terminal T1 (60*a*). In these examples of a COCON frame, the direction is not indicated, and the remote terminal will be able to use the direction of the associated channel to deduce the value of the direction bit "D".

The frame COCON(OF1, mytoken, {stream1_id, stream2 id}, . . . ) can include the following information: function identifier OF1, "mytoken" key, "stream1_id" and "stream2 id" channel identifiers respectively corresponding to the first channel and to the second channel. The frame COCON (OF2, myowntoken, stream3_id, . . . ) can include the following information: function identifier OF2, "myowntoken" key, "stream3_id" channel identifier corresponding to the third channel.

In one or more embodiments, separate OF functions can be invoked depending on the direction of traffic. Typically, a bidirectional channel can involve separate functions according to the orientation of the traffic. Referring to the example of FIG. 4*f* (which uses the reference architecture of FIG. 1*b*), terminals T1 (60*a*) and T2 (60*b*) are in communication via a network (63) and use a bidirectional data communication channel based on an encrypted connection: As illustrated by FIG. 4*f*, a bidirectional channel can therefore involve a function OF1 (61*a*) for the data of the channel sent by terminal T1 (60*a*), while the data of the channel sent by terminal T2 (60*b*) will be processed by OF2 (61*b*). To do this, in one or more embodiments, terminal T1 (60*a*) can insert a frame COCON(D=0, OF1, myT1token, stream1_id, . . . ) in a message intended for terminal T2 (60*b*), and terminal T2 (60*b*) can insert a frame COCON(D=1, OF2, myT2token, stream1_id, . . . ) in a message intended for terminal T1 (60*a*).

The frame COCON(D=0, OF1, myT1token, stream1_id, . . . ) can include the following information: direction from terminal T1 to terminal T2 (D=0), function identifier OF1, "mytoken" key, channel identifier "stream1_id" corresponding to the channel. The frame COCON(D=0, OF2, myT2token, stream1_id, . . . ) can include the following information: direction from terminal T2 to terminal T1 (D=0), function identifier OF2, "myT2token" key, channel identifier "stream1_id" corresponding to the same channel.

In one or more embodiments, the first message carrying data for the second terminal may be intended for the first intermediate processing function among a plurality of intermediate processing functions to be applied in a specific order to the data eligible for the second connection. This first message may also comprise a first ordered list, for example ordered according to the determined order of application of the functions, identifying the functions among the plurality of intermediate processing functions distinct from the first function to be applied to said eligible data.

These embodiments of the proposed method advantageously make it possible to handle the scenario in which several intermediate processing functions must be invoked for the same packet of a given connection.

Figures 4G, 4H:
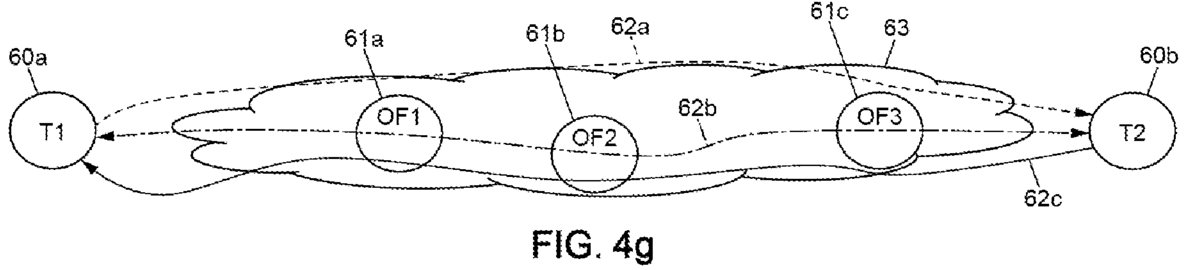
FIG. 4*g* illustrates an example of an invocation of a plurality of intermediate processing functions between a first terminal and a second terminal according to one or more embodiments.
FIG. 4*h* illustrates an example of a COCON(UPDATE) message format according to one or more embodiments.

In one or more embodiments in which a plurality of intermediate processing functions must be invoked for the same packet of a given connection, the first terminal may communicate to the second terminal (remote terminal) only the identity of the last OF function to be invoked when routing a packet to the remote terminal. With reference to the example of FIG. 4*g* (which uses the reference architecture of FIG. 1*b*), terminals T1 (60*a*) and T2 (60*b*) are in communication via a network (63) and communicate via three data communication channels (62*a*, 62*b*, 62*c*) over an encrypted connection: The first channel (62*a*) is a unidirectional channel from T1 to T2, the second channel (62*b*) is a bidirectional channel between T1 and T2, and the third channel (62*c*) is a unidirectional channel from T2 to T1. In the example of FIG. 4*g*, terminal T1 (60*a*) can insert a frame COCON(D=1, OF3, mytoken, stream2_id, . . . ) in a message to terminal T2 (60*b*). The frame COCON(D=1, OF3, mytoken, stream2_id, . . . ) can include the following information: direction from terminal T1 to terminal T2 (D=1), function identifier OF3 corresponding to the last function in the ordered sequence of functions OF1, OF2, and OF3 (61*a*, 61*b*, 61*c*) to be invoked for the data transmitted on the second channel (62*b*), "mytoken" key, and channel identifier "stream2_id" corresponding to the second channel.

In one or more embodiments, the first terminal may be configured to inform the second terminal, via the primary connection, of a modification affecting the use of an intermediate processing function.

For example, in one or more embodiments, the first terminal may be configured to inform the second terminal (remote terminal) of an update to the insertion policy of one or more OF functions by sending a COCON(UPDATE) message having a format as illustrated in FIG. 4*h*.

In one or more embodiments, the description of the fields of this frame may be identical to that of the fields of the COCON frame, except for the following fields:

- "List disabled Stream_IDs": Indicates the list of channels for which secondary connections should no longer be accepted. These channel identifiers must be excluded from the filter used to determine the data eligible for a secondary connection.
- "List disabled Connection IDs": Indicates the list of connection identifiers that should no longer be accepted. These connection identifiers must be excluded from the filter used to determine the data eligible for a secondary connection.

For example, the first terminal can use the frame COCON (UPDATE) to end the invocation of an OF function, to update the list of channels eligible for the service provided by an OF function, and/or to update the list of connection identifiers eligible for the service provided by an OF function.

In one or more embodiments, the primary connection may be established between the first terminal and the second terminal according to the QUIC protocol, and one or more secondary connections may be established between the first terminal and the second terminal, each via one or more intermediate functions established according to the TLS protocol.

Figure 5A:
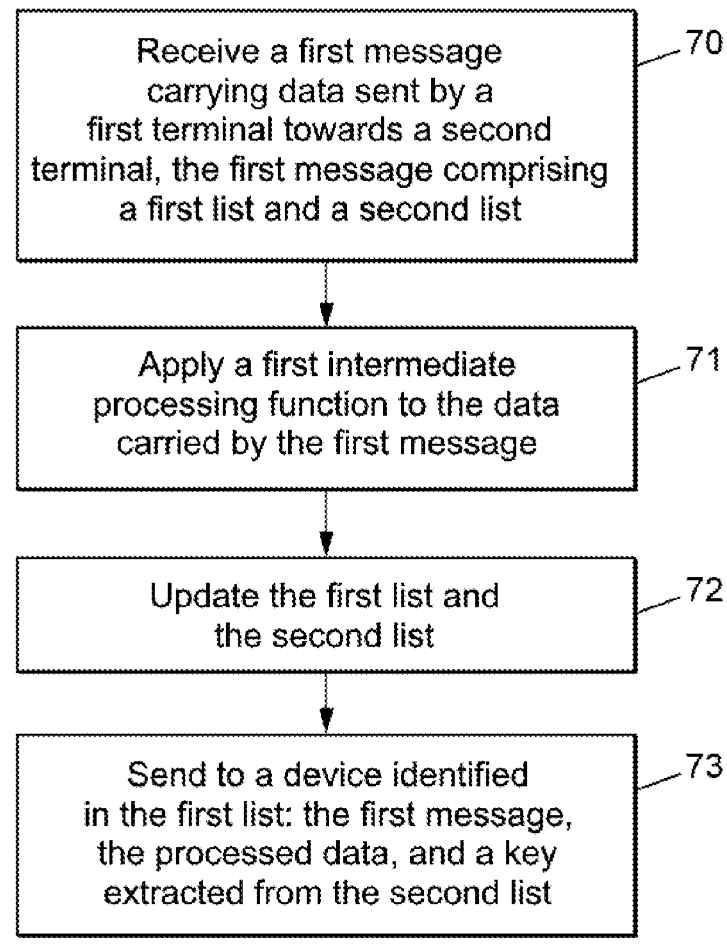
FIG. 5*a* is a diagram illustrating the proposed method according to one or more embodiments.

FIG. 5*a* is a diagram illustrating the proposed method according to one or more embodiments, from the point of view of an intermediate function.

According to one aspect, the proposed method relates to the processing of data transmitted in a network between a first terminal and a second terminal between which is established a first encrypted connection, carried out by a first device configured to implement a first intermediate processing function for data transmitted between the first terminal and the second terminal over a second connection via the first device.

In one or more embodiments, this first device can be configured to receive (70) from a first device of the network at least one first message intended for the first device, carrying data sent by the first terminal intended for the second terminal, said first device of the network being the first terminal or a second device configured to implement a second intermediate processing function for said data, the second connection being encrypted between the first device and the first device, said first message comprising: a first ordered list identifying at least one second device of the network to be traveled through by said at least one message in order to be routed to the second terminal, said at least one second device being the second terminal or at least one third device configured to implement a third intermediate processing function for said data, and a second ordered list comprising at least one key intended to be presented by each device in the first list to the next device in said first list, the key intended to be presented to the second terminal being shared between the first terminal and the second terminal.

The first device, which is configured to implement the first intermediate processing function, can, upon receiving the first message, apply (71) the first intermediate processing function to the data carried in the first message.

In one or more embodiments, this first device furthermore can update (72) the first list and the second list received with the first message.

In one or more embodiments, this first device can then send (73), to the next device identified in the first list, the first message incorporating the update of the first and second lists, with the data processed by the first intermediate processing function and the key extracted from the second list intended to be presented to the next device, the second connection being encrypted between the first device and the next device.

As discussed above, in the embodiments in which the first connection between the two terminals is established according to the QUIC protocol, the first terminal can insert a QUIC frame of the RELAY type as described above, in a control message or a data message from the first connection (primary connection) to the first device, in which case the first message received by the first device can be a RELAY frame.

Thus, in one or more embodiments, upon reception of a message containing a QUIC frame RELAY (List{Next_Hop_IP address/port}, Shared Token, . . . ) by a first device configured to implement an intermediate processing function (OF):

If several OF functions are to be invoked, then the list List{Next_Hop_IP address/port} can include the list of all OF functions to be invoked, except the first function, in addition to the address (and possibly the port number) of the remote terminal. In this case, the message is sent by the first terminal to the first function to be invoked, meaning to the first device configured to implement the first function to be invoked in the ordered sequence of functions to be invoked.

Thus, for a data packet having to pass through several intermediate processing functions, the first terminal can send a message to the first function to be implemented for the packet. The first function executes its service for the packet, then determines information enabling it to send the packet to the next function to be implemented for the packet.

Each OF intermediate processing function which must be invoked must process each packet eligible for the processing performed by the function.

In one or more embodiments, each intermediate processing function which must be invoked can update the list List{Next_Hop_IP address/port}, for example by removing the "Next_Hop_IP address/port" data corresponding to the next intermediate processing function to be invoked from the list List{Next_Hop_IP address/port}. The packet can then be transmitted to this next function using the "Next_Hop_IP address/port" data, after instantiating an entry in a RELAYED COLLABORATIVE CONNECTIONS BASE (RCCB) table, as described below. The proposed procedure can be repeated until the packet is received by the last OF function to be invoked. The processing to be performed then corresponds to the scenario in which only one function is to be invoked.

If only one OF function is to be invoked, then the list List{Next_Hop_IP address/port} contains only the address (and possibly the port number) of the second terminal (remote terminal). The message is sent using the IP address enabling access to the OF function as the destination address of the packet after execution of the service offered by the OF function.

In addition, in one or more embodiments, the OF function may include a new QUIC frame called GLUE(Shared_Token, [myID], . . . ). In other words, the packet output from the OF function can be encrypted according to a new security association to be established between the OF function and the second terminal. In one or more embodiments, the OF function can at that time instantiate an entry in the RCCB table. Moreover, the sending of the first packet (first message) may for example be based on the TLS 1.3 0-RTT mechanism, which allows sending the payload immediately.

In one or more embodiments, a device configured to implement an intermediate processing function may be configured to maintain the RCCB table, in order to handle the scenario in which different external addresses are used by the function to relay a given connection. This table is used in particular to keep in memory the IP address and the external port number used by the function for this connection.

Figure 5B:
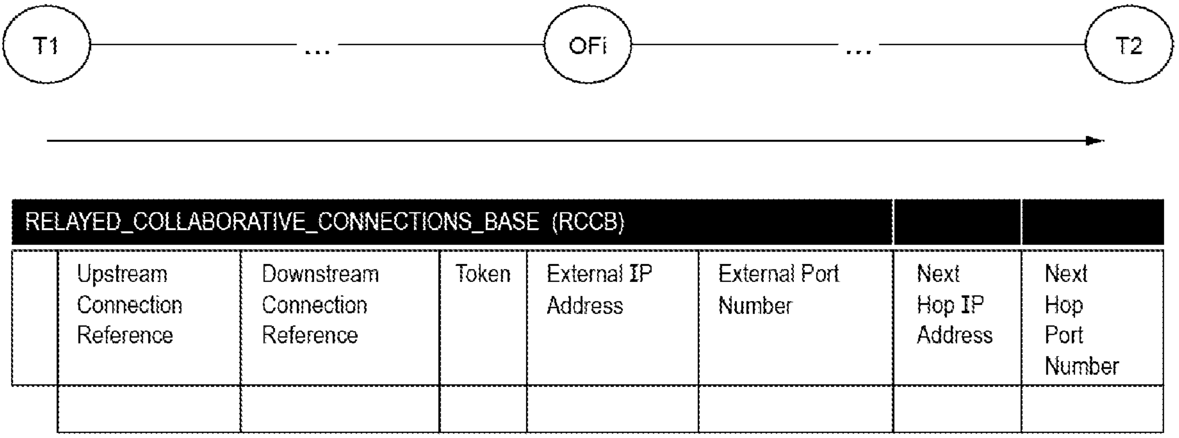
FIG. 5*b* illustrates an example of a table of relayed collaborative connections (RCCB) according to one or more embodiments.

FIG. 5*b* illustrates an example of an RCCB table structure maintained by a function OFi located on the data transmission path between a first terminal T1 and a second terminal T2 between which is established an encrypted connection. The RCCB table illustrated in FIG. 5*b* comprises the following fields:

"Upstream Connection Reference": Indicates the reference of the connection to be relayed by function OFi, the path of the data transmitted between the first terminal T1 and function OFi being designated by the "Upstream" path. In one or more embodiments, it may be preferable to use the TLS/DTLS security associations for this purpose, rather than the quadruplet {source address, source port, destination address, destination port}, in order to benefit from greater reliability.

"Downstream Connection Reference": Indicates the reference of the connection as relayed by function OFi, the path of the data transmitted between function OFi and the second terminal T2 being designated by the "Downstream" path. In one or more embodiments, this field can have the same structure and the same semantics as the "Upstream Connection Reference" field described above.

"Token": This field corresponds to the "Shared Token" received in a RELAY frame as part of an "Upstream" connection. This field is optional.

"External IP Address": Indicates the IP address used by function OFi as the source address for relaying the packets of the connection.

"External Port Number": Indicates the port number used by function OFi as the source port number for relaying the packets of the connection.

"Next_Hop_IP Address": Indicates the IP address used by function OFi as the destination address for relaying the packets of the connection. This field is optional; the information can be deduced by using the "Downstream" connection reference.

"Next Hop Port Number": Indicates the port number used by function OFi as the source address for relaying the packets of the connection. This field is optional; the information can be deduced by using the "Downstream" connection reference.

In one or more embodiments, if an "Upstream" connection is associated with several "Downstream" connections, the policy for traffic distribution between these different connections is typically local to the function OFi.

In addition, in one or more embodiments, an OF function requested in both directions of a QUIC connection ("T1 to T2" and "T2 to T1") can maintain entries in its RCCB table which correspond to each direction.

In one or more embodiments, any packet intended for a function OFi, but which does not contain a RELAY frame, can be processed according to the instructions of the RCCB table maintained by the function OFi. Upon receiving such a packet, the function OFi can consult its RCCB table in order to retrieve, where appropriate, the "Downstream" connection reference. Once the OFi service has been executed on the packet (for example, transcoding), the packet can be transmitted using the information specified in the RCCB table (source address, source port number, destination address, destination port number). Note that the service of the function OFi is not executed if no entry is found in the RCCB table.

In one or more embodiments, the GLUE frame may be used only for a predetermined number of eligible first packets (for example, for the first packet or the first three packets) in a new secondary connection, and may be omitted for other packets.

Figures 6A, 6B:
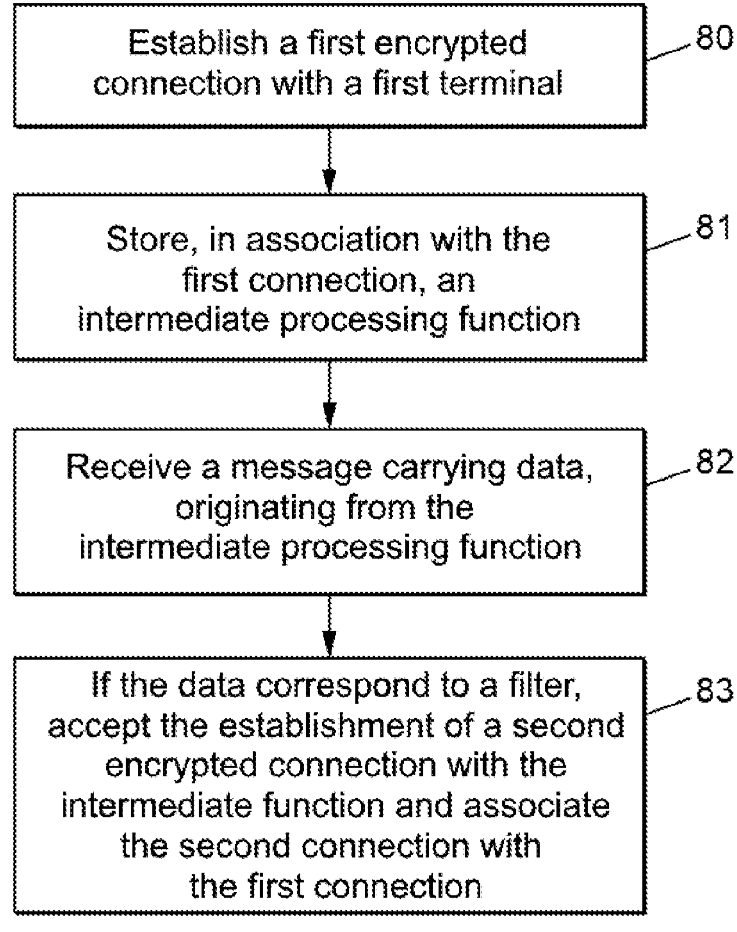
FIG. 6*a* is a diagram illustrating the proposed method at the remote terminal, according to one or more embodiments.
FIG. 6*b* illustrates an example of a trusted relayed stream (TRS) table according to one or more embodiments.

FIG. 6*a* is a diagram illustrating the proposed method according to one or more embodiments, from the point of view of the remote terminal (second terminal).

First and second terminals are considered, between which a first encrypted connection is established (80) for the transmission of data between the first terminal and the second terminal.

In one or more embodiments, the proposed method may comprise, at the second terminal, the storing (81), in association with the first connection, of an intermediate processing function intended to be applied between the first terminal and the second terminal to at least a part of the data transmitted between the first terminal and the second terminal, of a filter characterizing the at least a part of the eligible data, as well as a key shared with the first terminal.

The second terminal may also receive (82) at least one first message originating from the intermediate processing function, the first message carrying data sent by the first terminal.

The processing of this first message received may comprise a verification that the data carried by the first message correspond to the stored filter.

In the event of a correspondence, the second terminal can accept (83) the establishment of a second encrypted connection with the intermediate processing function and associate the second connection with the first connection. In this manner, the second terminal can, upon receiving data via the second connection and corresponding to the filter, associate the received data with the first connection.

As discussed above, in the embodiments in which the first connection between the two terminals is established according to the QUIC protocol, the first terminal can insert a QUIC frame of the COCON type as described above, in a control message or a data message from the first connection (primary connection) to the remote terminal, in which case the first message received by the second terminal can be a COCON frame, for example in the format illustrated in FIG. 4*a*.

Thus, in one or more embodiments, upon reception of a COCON frame by the second terminal (remote terminal), this terminal can update its QUIC connection tables to save a copy of the information contained in the message. In particular, the terminal can update a TRS table in order to keep in memory the data that are included in the COCON message.

FIG. 6*b* illustrates an example of a TRS table, its structure similar to that described above for the first terminal (concerning the offers made by the first terminal) and illustrated in FIG. 4*b*, except for the "status" field:

The TRS table illustrated in FIG. 6*b* (for the primary connection "Primary_Connection_Ref") contains the following information extracted from the COCON message:

"OF_ID": an identifier of an OF function.

"Direction": in one or more embodiments, this field indicates a first value indicating a use of the function identified by the unidirectional OF_ID field at the initiative of the second terminal, meaning for data sent by the second terminal, a second value indicating a use of the function identified by the unidirectional OF_ID field at the initiative of the first terminal, meaning for data sent by the first terminal, or a third value indicating a use of the function identified by the bidirectional OF_ID field, meaning for data sent by the first terminal or by the second terminal. For example, this field may indicate one of the following values: 0 (unidirectional at the initiative of the terminal), 1 (unidirectional at the initiative of the remote terminal), 2 (bidirectional).

"Token": A verification key which is to be presented to the second terminal (by an OF function) in order to establish a new secondary connection.

List of "Stream IDs": A filter which lists the channels whose data can be relayed by the function identified in the OF_ID field. In one or more embodiments, a predetermined value (for example "Any") may be used to indicate that the function can be invoked by all channels of a connection.

List of "Connection IDs": A filter which lists connection identifiers whose data are processed by the function identified in the OF_ID field. In one or more embodiments, a predetermined value (for example "Any") may be used to indicate that the function can be invoked for any identifier of a connection.

In one or more embodiments, the second terminal may be configured to retain an OF function only for a given direction. For example, the terminal can override the value of the "D" bit according to local policies. For example, with reference to FIG. 4*f*, if T1 offers a transcoding function OF1 for a bidirectional channel, T2 can decide to use another transcoding function OF2 for the same channel.

An acknowledgment message for the COCON frame may then be sent to the first terminal.

As discussed above, in the embodiments in which the first connection between the two terminals is established according to the QUIC protocol, the device or equipment configured to implement the single function or, in the case where several functions are invoked for a same data packet transmitted between the two terminals, the last function to be implemented for the packet, may insert a QUIC frame of the GLUE type as described above, into a control message or a data message from the second connection (secondary connection) to the second terminal, in which case the first message received by the second terminal may be a GLUE frame, as described above.

Figure 6C:
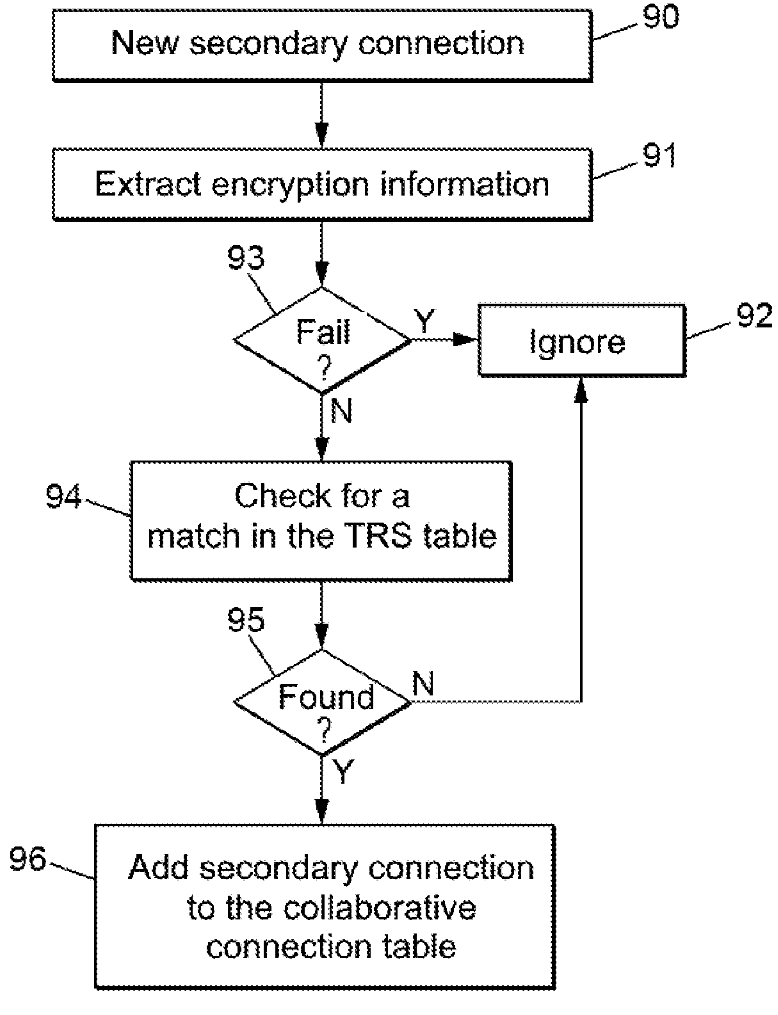
FIG. 6*c* is a diagram illustrating an example of a method for processing a new secondary connection to the remote terminal according to one or more embodiments.
Figure 6D:
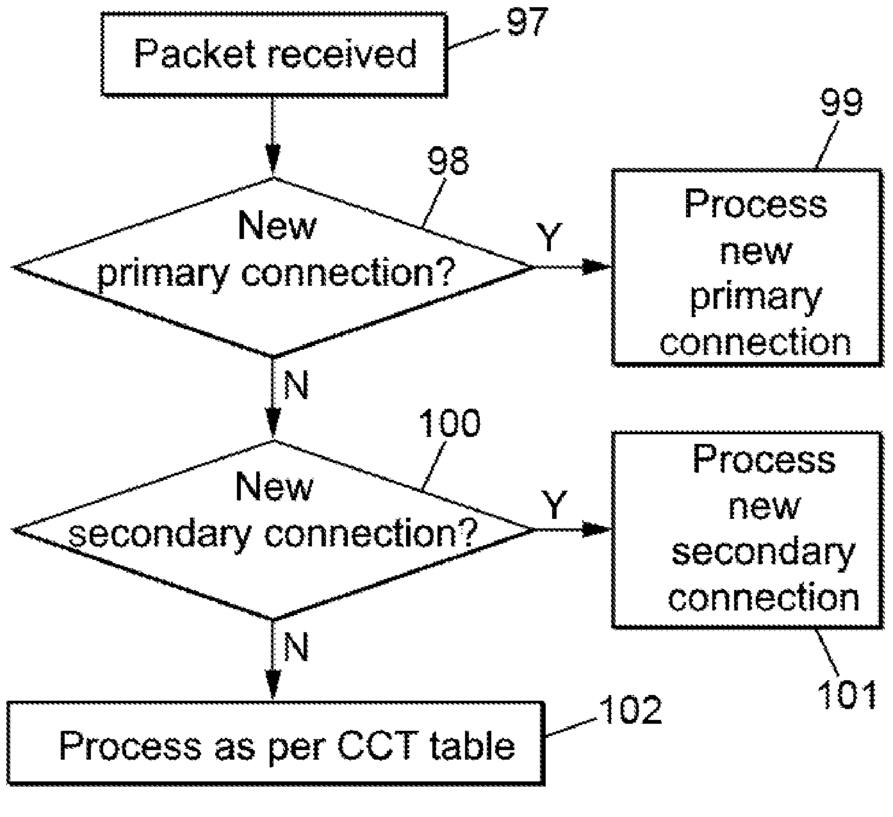
FIG. 6*d* illustrates an example of a method for processing a new packet at the remote terminal according to one or more embodiments.

With reference to FIG. 6*c*, in one or more embodiments, the second terminal (T2) may be configured to, upon receiving (90) a message containing a GLUE( ) frame, extract the connection identifier, the channel identifier, the "Shared Token" key, and the function identifier as follows:

The channel and connection identifier can be extracted according to the procedures described in the QUIC specification.

The "Shared Token" identifier can be extracted (91) from the GLUE frame. By default, the second terminal ignores (92) the GLUE frame received in the event of a failure to extract the "Shared Token" identifier.

The function identifier can be extracted using the GLUE frame (using the "myID" field), or, alternatively, by applying a hash calculation algorithm (for example SHA-256) from the "Pre-Shared Key (PSK) identity" information used by the OF function in the "ClientKeyExchange" TLS message.

After having extracted this information, the second terminal can be configured to consult (94) the TRS table described above, maintained by the second terminal, to check whether the information thus extracted matches an entry in the TRS table. If an entry has been found (95), the second terminal accepts (96) the establishment of the new TLS collaborative connection with the OF function. A pointer to this new connection is then added to the QUIC connections table. The data received using a secondary connection (for example OF-T2) is thus associated with the primary connection T1-T2. By default, the second terminal ignores (92) the received GLUE frame if no entry is found in its TRS table.

In one or more embodiments, the second terminal may be configured to apply this control procedure only for a predetermined number of first packets (e.g., 3) processed by the OF function. In this case, the subsequent packets can be processed according to the instructions in the CCT table, and the GLUE frame is no longer used.

FIG. **6*d*** illustrates an example of a method for processing a new packet received by the second terminal according to one or more embodiments of the proposed method.

Upon receiving (97) a new packet, the terminal determines (98) whether or not the received packet is associated with a new primary connection. In the event that the received packet is associated with a new primary connection, it is processed (99) while taking into consideration a new primary connection as described above. In the event that the received packet is not associated with a new primary connection, the terminal determines (100) whether or not the received packet is associated with a new secondary connection. In the event that the received packet is associated with a new secondary connection, it is processed (101) while taking into consideration a new secondary connection as described above. In the event that the received packet is associated with an existing secondary connection (i.e., an entry corresponding to this packet was found in the CCT table), the terminal processes it (102) using the instructions from said entry in the CCT table, as described above.

In one or more embodiments, the packets are rejected if no entry is found in the TRS table (for the first N packets, N being a predetermined integer) or if no entry is found in the CCT table (for the other packets).

Various example scenarios for the use of the proposed method according to one or more embodiments are provided below, with reference to FIGS. **7*a* to 7*f***.

FIGS. **7*a* to 7*c* show various examples of rejection of an OF function, for communications, in a communication network, between a first terminal T1 and a second terminal T2** (remote terminal) between which a QUIC connection is established.

FIG. **7*a* illustrates the case where an OF function is the object of an insertion attempt in a connection (for example for the purpose of data theft), but the connection is rejected by T2 because the key presented in the associated COCON frame does not correspond to any entry in the TRS table maintained by T2**.

FIG. **7*b* illustrates the case where an OF function is the object of an insertion attempt in a connection (for example for the purpose of data theft), but the connection is rejected by T2 because the channel identifier does not correspond to the one indicated in the TRS table maintained by T2**.

FIG. **7*c* illustrates the case where an OF function is the object of an insertion attempt in a connection (for example for the purpose of data theft), but the connection is rejected by T2 because the function identifier presented does not match any entry in the TRS table maintained by T2 for T1**.

FIGS. **7*d* to 7*f* show various examples of successful collaborative connections, for communications, in a communication network, between a first terminal T1 and a second terminal T2** (remote terminal) between which a QUIC connection is established.

FIG. **7*d* illustrates the example of a successful collaborative connection between T1 and T2. This connection involves a single function OF1 as described in the COCON frame sent by T1 to T2: COCON(OF1, 485rHjaKLkalBbjrCJghiD, stream_id=0x04579) (offer to use function OF1 for data sent on the channel having identifier "0x04579", with sharing of key "485rFIjaKLkalBbjrCJghiD" with function OF1**). The connections are relayed according to the instructions entered in the RCCB table.

Upon reception of the COCON frame from the first terminal T1, the second terminal T2 instantiates an entry in its TRS table, as described above, and optionally transmits to the first terminal T1 an acknowledgment of acceptance of the offer to use function OF1. The first terminal T1 transmits to function OF1 the data (DATA) on which the service of function OF1 is to be performed, as well as a frame RELAY(@T2, 485rHjaKLkalBbjrCJghiD, . . . ) indicating the address of T2 and the key shared with function OF1. Function OF1 performs the service corresponding to function OF1 on the data received with the RELAY frame (for example, it transcodes the data received), instantiates an entry in its RCCB table, and transmits the processed data (DATA) to the second terminal as well as a frame GLUE (485rHjaKLkalBbjrCJghiD, Upon reception of the frame GLUE(485rHjaKLkalBbjrCJghiD, . . . ), the second terminal T2 only associates the two TLS connections after having verified that its TRS table does indeed contain an entry corresponding to function OF1 and to the key received from OF1 ("485rFIjaKLkalBbjrCJghiD"). In addition, the second terminal T2 instantiates an entry in its CCT table, as described above. It then optionally sends a GLUE frame to confirm the association of connections GLUE(Confirmed, OF1, 0x04579, . . . ) to terminal T1. As indicated above, the transmission of subsequent data between the first terminal and function OF1 on the one hand, then between function OF1 and the second terminal T2 on the other hand, may respectively not use RELAY and/or GLUE messages. Upon the reception of data by function OF1, service OF1 is implemented, then the relay instructions for the processed data are obtained by consulting the RCCB table. Upon reception of the data processed by the second terminal T2, the data received are associated with two TLS collaborative connections on the basis of the CCT table. If function OF1 can be invoked for both directions of the connection, similar processing is performed by OF1 for the packets received from T2 to T1.

FIG. **7*e* illustrates another example of a successful collaborative connection between first and second terminals T1 and T2 and which involves two functions OF1 and OF2**.

The connection between T1 and T2 involves two functions OF1 and OF2 as described in the COCON frame sent by T1 to T2:

COCON(OF2, CJghiD, stream_id=0x04579) (offer to use function OF2 for data sent on the channel having identifier "0x04579", with sharing of the "CJghiD" key with function OF2). The connections are relayed according to the instructions entered in the respective RCCB tables maintained by the devices respectively implementing functions OF1 and OF2.

Upon receiving the COCON frame from the first terminal T1, the second terminal T2 instantiates an entry in its TRS table, as described above, and optionally transmits an acknowledgment of acceptance of the offer to use function OF2 to the first terminal T1. The first terminal T1 transmits, to a device for implementing function OF1, data (DATA) on which the service of function OF1 is to be performed as well as a frame RELAY({@OF2,@T2}, CJghiD, . . . ) indicating the key shared with function OF1. The device for implementing function OF1 performs the service corresponding to function OF1 on the data received with the RELAY frame (for example, it transcodes the data received), instantiates an entry in its RCCB table, and transmits to a device implementing function OF2 the processed data (DATA) as well as a frame RELAY(@T2, CJghiD, . . . ) indicating the key shared with function OF2 (which is, in this example, identical to the key shared with function OF1). The device implementing function OF2 performs the service corresponding to function OF2 on the data received with the RELAY frame, instantiates an entry in its RCCB table, and transmits the processed data to the second terminal as well as a frame GLUE(CJghiD, . . . ). Upon receiving the frame GLUE(CJghiD, . . . ), the second terminal T2 associates the two TLS connections only after having checked that its TRS table does indeed contain an entry corresponding to function OF2 and to the key received from OF2 ("CJghiD") for this connection. In addition, the second terminal T2 instantiates an entry in its CCT table, as described above. It then optionally sends a GLUE connection association confirmation frame to terminal T1 (not shown in the figure). As indicated above, subsequent data transmissions between the first terminal and function OF1 on the one hand, between functions OF1 and OF2, then between function OF2 and the second terminal T2 on the other hand, respectively may not use RELAY and/or GLUE messages. Upon reception of data by function OF1 (respectively OF2), service OF1 (respectively OF2) is carried out for the data received, then the relay instructions for the processed data are obtained by consulting the RCCB table. Upon reception of the processed data by the second terminal T2, the data received are associated with two TLS collaborative connections on the basis of the CCT table.

Figure 7A:
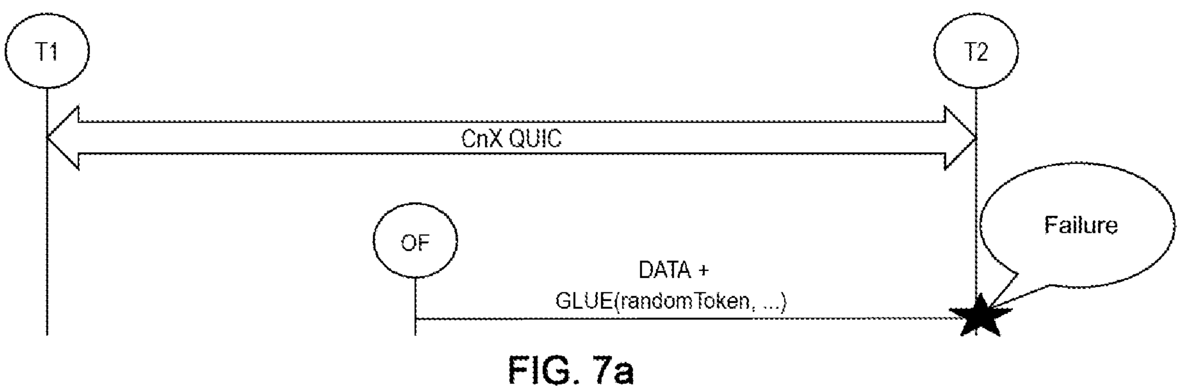
FIG. 7*a* illustrates an example of a rejection of an intermediate processing function according to one or more embodiments.
Figure 7B:
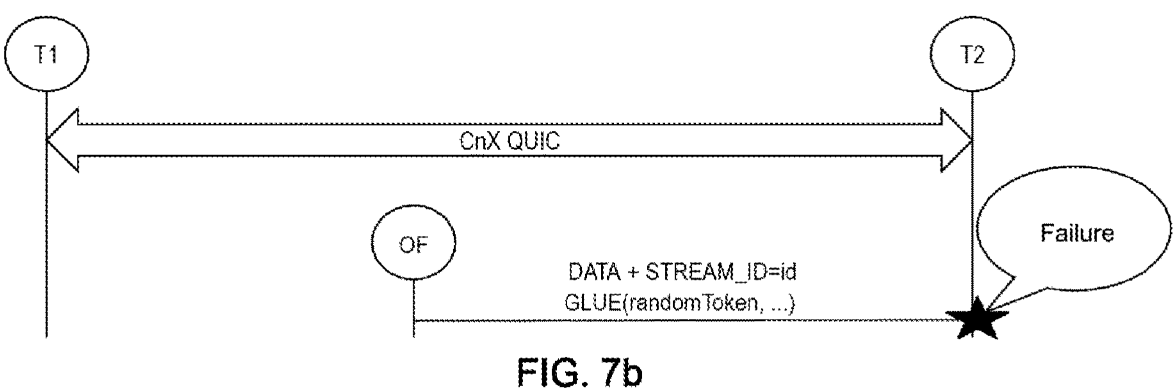
FIG. 7*b* illustrates an example of a rejection of an intermediate processing function according to one or more embodiments.
Figure 7C:
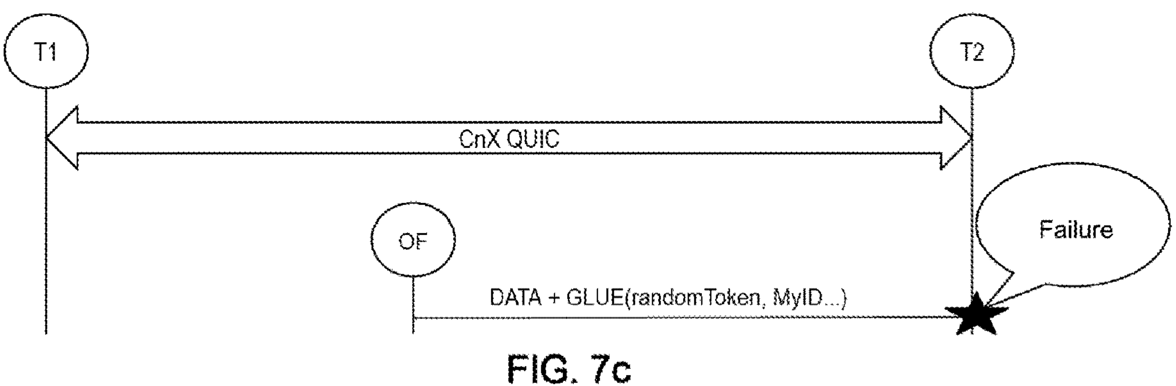
FIG. 7*c* illustrates an example of a rejection of an intermediate processing function according to one or more embodiments.
Figure 7D:
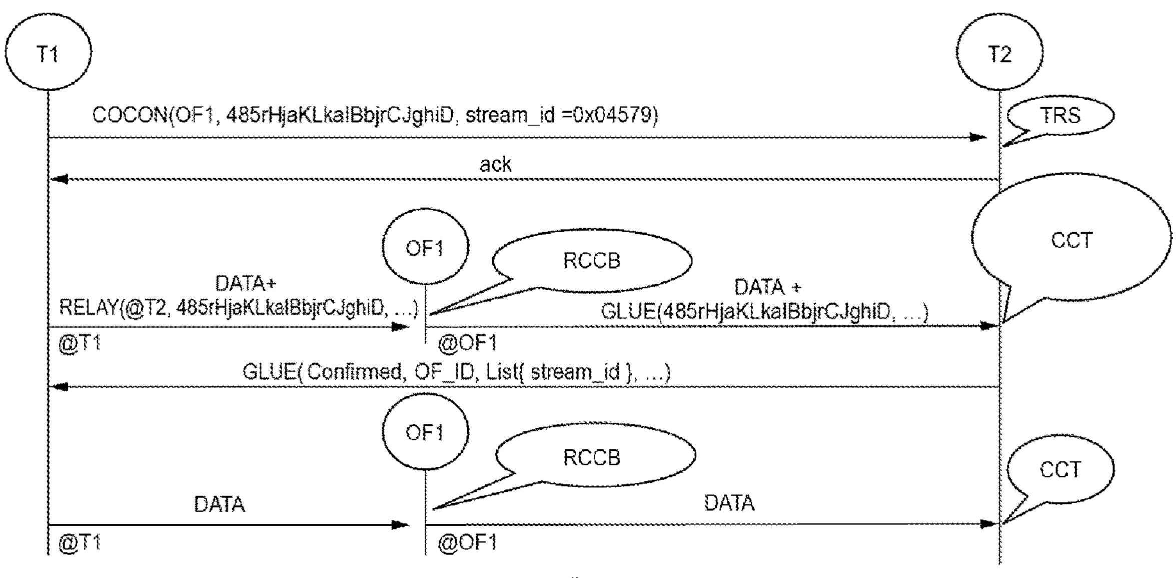
FIG. 7*d* illustrates an example of a successful collaborative connection according to one or more embodiments.
Figure 7E:
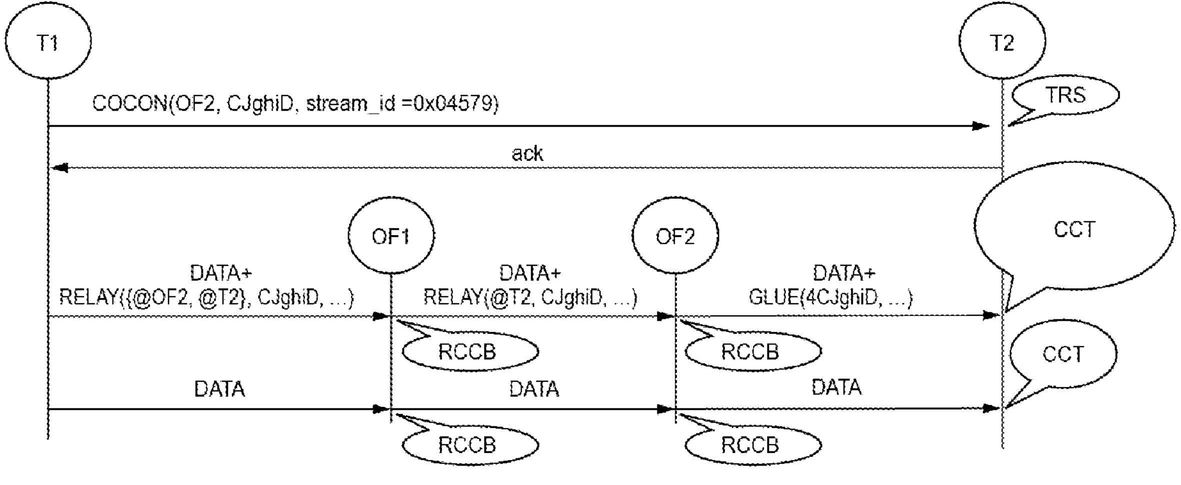
FIG. 7*e* illustrates an example of a successful collaborative connection according to one or more embodiments.
Figure 7F:
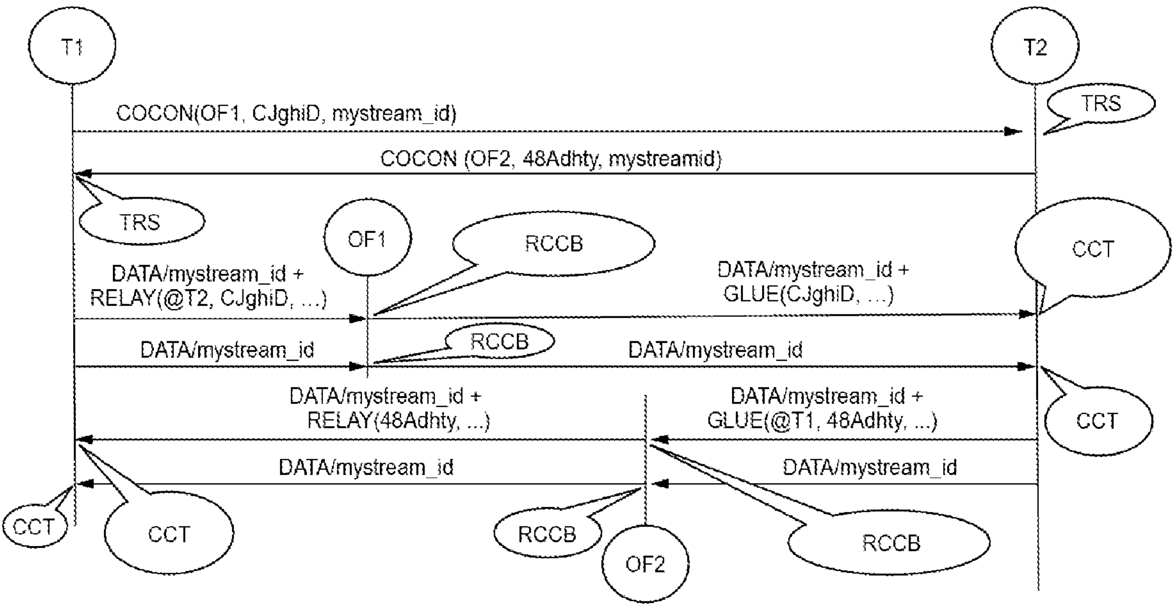
FIG. 7*f* illustrates an example of a successful collaborative connection according to one or more embodiments.

FIG. 7*f* illustrates another example of a successful collaborative connection between T1 and T2 which involves two functions OF1 and OF2: function OF1 is involved for the channel data sent by T1 to T2, while the data of the same channel sent by T2 to T1 are processed by OF2. The order of the COCON frames is provided as an example.

In one or more embodiments, terminal T2 can inform T1 of the addition of an OF function to a connection. To do this, T2 sends a frame GLUE(Confirmed, OF_ID, List{stream_id}, . . . ) to T1. T1 can use this frame to detect insertion of an OF function which in principle is unauthorized. It can signal to T2 the rejection of this secondary connection by sending a COCON(UPDATE) message, as described above.

Figure 8A:
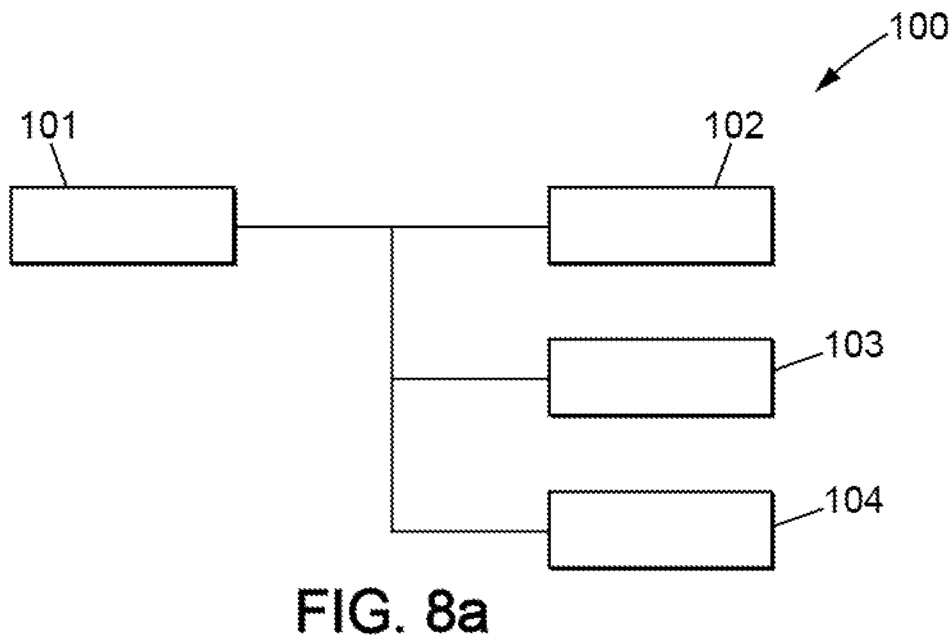
FIG. 8*a* illustrates an example terminal architecture according to one or more embodiments.

FIG. 8*a* illustrates an example of the architecture of a terminal for implementing the proposed method.

With reference to FIG. 8*a*, the device 100 comprises a controller 101, operatively coupled to a communication interface 102 and to a memory 103, which controls a communication management module according to a QUIC protocol 104.

The communication interface 102 comprises one or more communication units, each configured to send and/or receive data according to one or more data communication protocols (wired or wireless), for example WLAN, Ethernet, LTE, LTE-A.

The controller 101 is configured to control the communications management module 104 and the communications interface 102 for the implementation of one or more embodiments of the proposed method.

The communications management module 104 is configured for the implementation of the proposed method by a terminal. In particular, the communications management module 104 can be configured to perform the functions and carry out the acts described in this description for the implementation of the proposed method by a terminal (local and/or remote).

The device 100 may be a computer, a network of computers, an electronic component, or another device comprising a processor operatively coupled to a memory, as well as, depending on the embodiment chosen, a data storage unit, and other associated hardware elements such as a network interface and a media drive for reading from and writing to a removable storage medium (not shown in the figure). The removable storage medium may be, for example, a compact disc (CD), digital video/versatile disc (DVD), flash drive, USB stick, SSD memory, etc. Depending on the embodiment, the memory, data storage unit, or removable storage medium contains instructions which, when executed by the controller 101, cause this controller 101 to carry out or control the communications management module 104 and communication interface 102 portions of the exemplary implementations of the proposed method described in this description. The controller 101 may be a component implementing a processor or a computing unit for the management of communications according to the proposed method and for the control of units 102 and 104 of the device 100.

The device 100 may be implemented in software form, in hardware form, such as an application-specific integrated circuit (ASIC), or in the form of a combination of hardware and software elements, for example such as a software program intended to be loaded and executed on an FPGA (Field Programmable Gate Array) type of component. Similarly, the communications management module 104 may be implemented in software form, in hardware form, such as an ASIC, or in the form of a combination of hardware and software elements, for example such as a software program intended to be loaded and executed on an FPGA type of component.

Figure 8B:
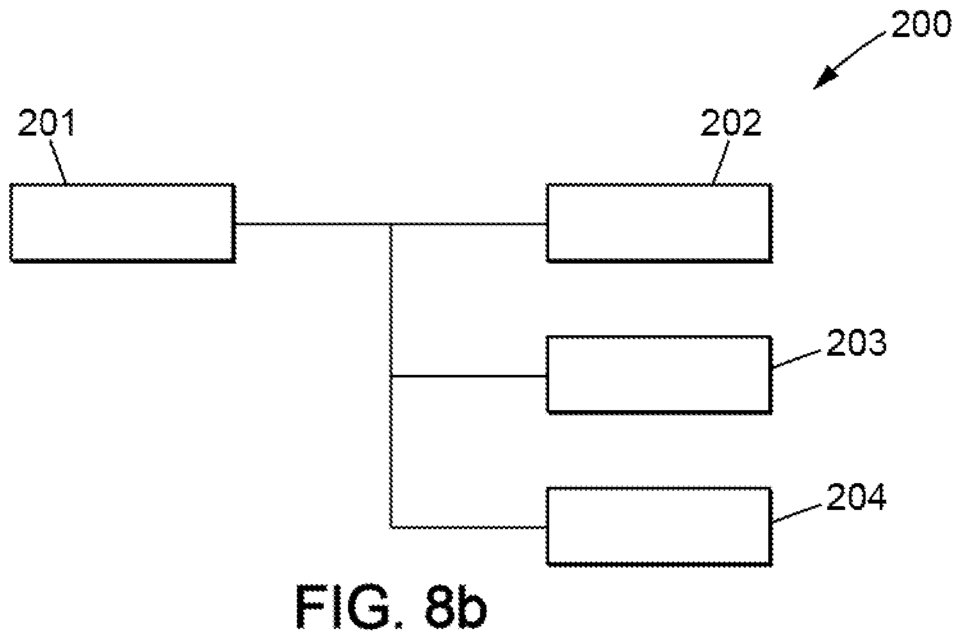
FIG. 8*b* illustrates an example relay architecture according to one or more embodiments.

FIG. 8*b* illustrates an example of the architecture of a device configured to implement one or more intermediate processing functions for the implementation of the proposed method.

With reference to FIG. 8*b*, the device 200 comprises a controller 201, operatively coupled to a communication interface 202 and to a memory 203, which controls a function service module 204.

The communication interface 202 comprises one or more communication units, each configured to send and/or receive data according to one or more data communication protocols (wired or wireless), for example WLAN, Ethernet, LTE, LTE-A.

The controller 201 is configured to control the function service module 204 and the communication interface 202 for the implementation of one or more embodiments of the proposed method.

The function service module 204 is configured for the implementation of the proposed method by a node implementing a function. In particular, the function service module 204 may be configured to perform the functions and carry out the acts described in this description for the implementation of the proposed method by a node implementing a function.

The device 200 may be a computer, a network of computers, an electronic component, or another device comprising a processor operatively coupled to a memory, as well as, depending on the embodiment chosen, a data storage unit, and other associated hardware elements such as a network interface and a media drive for reading from and writing to a removable storage medium (not shown in the figure). The removable storage medium may be, for example, a compact disc (CD), digital video/versatile disc (DVD), flash drive, USB stick, SSD memory, etc. Depending on the embodiment, the memory, data storage unit, or removable storage medium contains instructions which, when executed by the controller 201, cause this controller 201 to carry out or control the function service module 204 and communication interface 202 portions of the exemplary implementations of the proposed method described in this description. The controller 201 may be a component implementing a processor or a computing unit for the management of communications according to the proposed method and for the control of units 202 and 204 of the device 200.

The device 200 may be implemented in software form, in hardware form, such as an application-specific integrated circuit (ASIC), or in the form of a combination of hardware and software elements, for example such as a software program intended to be loaded and executed on an FPGA (Field Programmable Gate Array) type of component. Similarly, the function service module 204 may be implemented in software form, in hardware form, such as an ASIC, or in the form of a combination of hardware and software elements, for example such as a software program intended to be loaded and executed on an FPGA type of component.

The implementation of the proposed method according to the embodiments described in this description advantageously makes it possible: (1) to enhance the operator's network by introducing mechanisms optimizing the use of resources mobilized for the establishment and maintenance of QUIC communications, (2) to promote the mechanisms for invoking network functions with explicit consent, (3) for QUIC communications to benefit from network operator support in the form of optimized management of resources mobilized by these communications in order to improve the level of quality associated with these communications and as perceived by users, (4) to simplify the use of QUIC clients by means of practical coordination/collaboration with the operators' network, (5) to introduce more flexibility in the invocation and withdrawal of network functions without inducing additional delays for the exchange of data, the level of security and robustness associated with each QUIC communication also being maintained, if not reinforced, by the resources available to the operator, (6) to promote new practices such as the invocation of network functions on demand, (7) to allow selective invocation of network functions per channel ("stream").

Depending on the embodiment chosen, certain acts, actions, events, or functions of each of the methods described in this document may be carried out or occur in a different order from that in which they have been described, or may be added, merged, or may not be carried out or occur, as the case may be. Furthermore, in some embodiments, certain acts, actions, or events are carried out or occur concurrently and not sequentially.

Although described via a number of detailed exemplary embodiments, the proposed control method and the device for implementing an embodiment of the method comprise various variants, modifications, and improvements which will be obvious to those skilled in the art, it being understood that these various variants, modifications, and improvements lie within the scope of the present disclosure as defined by the claims which follow. In addition, various aspects and features described above may be implemented together, or separately, or substituted for one another, and all of the various combinations and sub-combinations of the aspects and features are within the scope of present disclosure. Furthermore, some systems and devices described above may not incorporate all of the modules and functions described for the preferred embodiments.

The invention claimed is:

1. A method of communication in a network, the method comprising, between a first terminal and a second terminal between which is established a first encrypted connection for transmitting data:

storing, by the first terminal, in association with said first connection, at least one second connection between the first terminal and the second terminal via at least one intermediate processing function intended to be applied to at least a part of said data referred to as eligible for the second connection, and a filter characterizing said data eligible for the second connection, for establishing a collaborative connection between the first and second terminals comprising the first encrypted connection and the associated at least one second connection, said at least one second connection being encrypted between the first terminal and said intermediate processing function; and sending, by the first terminal, data to the second terminal via the collaborative connection by sending, via said second connection, at least one first message intended for said intermediate function and carrying said data for the second terminal, wherein said data correspond to said filter, and the first message comprises information according to which said data are intended for the second terminal, wherein:

said first connection is established between the first terminal and the second terminal according to the QUIC protocol; and at least one said second connection is established according to the TLS protocol between the first terminal and the second terminal via at least one said intermediate function capable of decrypting the data exchanged via said second connection.

2. The method according to claim 1, further comprising:

sending, via the first data connection to the second terminal, data which do not correspond to said filter.

3. The method according to claim 1, further comprising, upon receiving data via said second connection, associating said data with said first connection if the data correspond to said filter.

4. The method according to claim 1, wherein said first message further comprises a key intended to be presented by the intermediate function to the second terminal, and shared between the first terminal and the second terminal.

5. The method according to claim 1, further comprising: informing the second terminal, in at least one message sent via said first connection to the second terminal, of the use of said intermediate processing function for said at least a part of said data.

6. The method according to claim 5, wherein said at least one message informing the second terminal of the use of said intermediate processing function comprises at least one item among:

an identifier of said intermediate processing function;

a key to be presented by the intermediate function to the second terminal;

said filter characterizing the data eligible for said second connection;

at least one connection identifier eligible for said second connection; and information about the direction of the data transmission via the second connection to which said intermediate processing function is applied.

7. The method according to claim 5, wherein the use by the first terminal of said second connection in order to send data to the second terminal is subject to the reception by the first terminal of an acknowledgment from the second terminal of the use of said intermediate processing function.

8. The method according to claim 1, wherein, on the second connection, a plurality of intermediate processing functions can be applied to the data eligible for the second connection in a determined order, and:

said at least one message carrying data for the second terminal is intended for the first intermediate processing function that is to be applied to said data eligible for the second connection; and said first message sent further comprises a first list ordered according to said determined order identifying the functions among said plurality of intermediate processing functions that are distinct from the first function and are to be applied to said eligible data.

9. The method according to claim 8, wherein said first message sent further comprises a second list, ordered according to said determined order, of keys intended to be presented by each of the intermediate processing functions identified in the first list to the next intermediate processing function in said first list, or, for the last intermediate processing function of the first list, to the second terminal, a key intended to be presented to the second terminal being shared between the first terminal and the second terminal.

10. The method according to claim 1, further comprising: informing the second terminal via the first connection of a modification affecting the use of said intermediate processing function.

11. A method of communication in a network, the method comprising, between a first terminal and a second terminal between which is established a first encrypted connection for transmitting data:

storing, by the second terminal, in association with said first connection, an intermediate processing function intended to be applied between the first terminal and the second terminal on at least a part of said data, a filter characterizing said at least a part of the data, and a key shared with the first terminal;

receiving, by the second terminal, at least one first message originating from said intermediate function, carrying data sent by the first terminal;

checking, by the second terminal, whether said data correspond to the stored filter; and if they correspond:

accepting the establishment of a second encrypted connection with the intermediate function and associating said second connection with the first connection, wherein the first encrypted connection and the second encrypted connection are comprised in a collaborative connection established between the first and second terminals; and upon receiving data via said second connection corresponding to said filter, associating said data with the first connection, wherein:

said first connection is established between the first terminal and the second terminal according to the QUIC protocol; and at least one said second connection is established according to the TLS protocol between the first terminal and the second terminal via at least one said intermediate function capable of decrypting the data exchanged via said second connection.

12. The method of communication according to claim 11, wherein said first message further comprises a key presented by the intermediate processing function to the second terminal, the establishment of the second encrypted connection being accepted if said received key corresponds to a key shared with the first terminal.

13. The method of communication according to claim 11, further comprising: sending data corresponding to said filter to the first terminal via said second connection, in a message intended for the intermediate function.

14. A method comprising, for processing data transmitted in a network between a first terminal and a second terminal between which is established a first encrypted connection, for a first device configured to implement a first intermediate processing function for data transmitted between the first terminal and the second terminal over a second connection via said first device:

receiving from a first device of the network at least one first message intended for the first device, carrying data sent by the first terminal intended for the second terminal, said first device of the network being the first terminal or a second device configured to implement a second intermediate processing function for said data, the second connection being encrypted between the first device and the first device, said first message comprising:

a first ordered list identifying at least one second device of the network to be traveled through by said at least one message in order to be routed to the second terminal, said at least one second device being the second terminal or at least one third device configured to implement a third intermediate processing function for said data; and a second ordered list comprising at least one key intended to be presented by each device in the first list to the next device in said first list, the key intended to be presented to the second terminal being shared between the first terminal and the second terminal;

applying the first intermediate processing function to said data carried in said at least one first message;

updating the first list and the second list; and sending, to the next device identified in the first list, said at least one first message integrating the update to the first and second lists, with the data processed by the first intermediate processing function and the key extracted from the second list intended to be presented to the next device, the second connection being encrypted between the first device and the next device.

15. The method of processing according to claim 14, further comprising:

storing for the second connection:

a source IP address and a source port number which are used by the first intermediate device to relay said data from said at least one first message; and a destination IP address and a destination port number corresponding to the next device identified in the first list, to which said data of said at least one first message are transmitted;

receiving from the first device at least one second message intended for the first intermediate device, carrying data sent by the first terminal to the second terminal, in which the first list is absent;

applying the first intermediate processing function to said data carried in said at least one second message; and sending, to the stored destination IP address and destination port, said at least one second message with the data processed by the first intermediate processing function.

16. A data communication device, comprising a processor and a memory operatively coupled to the processor, wherein the processor is configured to implement a method of communication in a network, between a first terminal and a second terminal between which is established a first encrypted connection for transmitting data, the method carried out by the first terminal, and comprising:

storing, in association with said first connection, at least one second connection between the first terminal and the second terminal via at least one intermediate processing function intended to be applied to at least a part of said data referred to as eligible for the second connection, and a filter characterizing said data eligible for the second connection, for establishing a collaborative connection between the first and second terminals comprising the first encrypted connection and the associated at least one second connection, said at least one second connection being encrypted between the first terminal and said intermediate processing function; and sending data to the second terminal via the collaborative connection by sending, via said second connection, at least one first message intended for said intermediate function and carrying said data for the second terminal, wherein said data correspond to said filter, and the first message comprises information according to which said data are intended for the second terminal, wherein:

said first connection is established between the first terminal and the second terminal according to the QUIC protocol; and at least one said second connection is established according to the TLS protocol between the first terminal and the second terminal via at least one said intermediate function capable of decrypting the data exchanged via said second connection.

17. A data communication system, comprising a first terminal configured to implement a method of communication in a network, between a first terminal and a second terminal between which is established a first encrypted connection for transmitting data, the method carried out by the first terminal, and comprising: storing, in association with said first connection, at least one second connection between the first terminal and the second terminal via at least one intermediate processing function intended to be applied to at least a part of said data referred to as eligible for the second connection, and a filter characterizing said data eligible for the second connection, for establishing a collaborative connection between the first and second terminals comprising the first encrypted connection and the associated at least one second connection, said at least one second connection being encrypted between the first terminal and said intermediate processing function; and sending data to the second terminal via the collaborative connection by sending, via said second connection, at least one first message intended for said intermediate function and carrying said data for the second terminal, wherein said data correspond to said filter, and the first message comprises information according to which said data are intended for the second terminal; a second terminal configured to implement a method of communication in a network, between a first terminal and a second terminal between which is established a first encrypted connection for transmitting data, the method carried out by the second terminal, and comprising: storing, in association with said first connection, an intermediate processing function intended to be applied between the first terminal and the second terminal on at least a part of said data, a filter characterizing said at least a part of the data, and a key shared with the first terminal; receiving at least one first message originating from said intermediate function, carrying data sent by the first terminal; checking whether said data correspond to the stored filter; and if they correspond: accepting the establishment of a second encrypted connection with the intermediate function and associating said second connection with the first connection; and upon receiving data via said second connection corresponding to said filter, associating said data with the first connection; and a device configured to implement a method of processing data transmitted in a network between a first terminal and a second terminal between which is established a first encrypted connection, the method comprising, for a first device configured to implement a first intermediate processing function for data transmitted between the first terminal and the second terminal over a second connection via said first device: receiving from a first device of the network at least one first message intended for the first device, carrying data sent by the first terminal intended for the second terminal, said first device of the network being the first terminal or a second device configured to implement a second intermediate processing function for said data, the second connection being encrypted between the first device and the first device, said first message comprising: a first ordered list identifying at least one second device of the network to be traveled through by said at least one message in order to be routed to the second terminal, said at least one second device being the second terminal or at least one third device configured to implement a third intermediate processing function for said data; and a second ordered list comprising at least one key intended to be presented by each device in the first list to the next device in said first list, the key intended to be presented to the second terminal being shared between the first terminal and the second terminal; applying the first intermediate processing function to said data carried in said at least one first message; updating the first list and the second list; and sending, to the next device identified in the first list, said at least one first message integrating the update to the first and second lists, with the data processed by the first intermediate processing function and a key extracted from the second list intended to be presented to the next device, the second connection being encrypted between the first device and the next device.

18. A processing circuit comprising a processor and a memory, the memory storing code instructions of a computer program comprising portions of code for implementing a method of communication in a network, between a first terminal and a second terminal between which is established a first encrypted connection for transmitting data, the method carried out by the first terminal, and comprising: storing, in association with said first connection, at least one second connection between the first terminal and the second terminal via at least one intermediate processing function intended to be applied to at least a part of said data referred to as eligible for the second connection, and a filter characterizing said data eligible for the second connection, for establishing a collaborative connection between the first and second terminals comprising the first encrypted connection and the associated at least one second connection, said at least one second connection being encrypted between the first terminal and said intermediate processing function; and sending data to the second terminal via the collaborative connection by sending, via said second connection, at least one first message intended for said intermediate function and carrying said data for the second terminal, wherein said data correspond to said filter, and the first message comprises information according to which said data are intended for the second terminal, during the execution of said program by the processor, wherein:

said first connection is established between the first terminal and the second terminal according to the QUIC protocol; and at least one said second connection is established according to the TLS protocol between the first terminal and the second terminal via at least one said intermediate function capable of decrypting the data exchanged via said second connection.

19. The data communication device according to claim 16, wherein the method for communication in a network further comprises: sending, via the first data connection to the second terminal, data which do not correspond to said filter.

* * * * *